United States Patent
Starns et al.

(10) Patent No.: US 10,891,512 B2
(45) Date of Patent: Jan. 12, 2021

(54) APPARATUS AND METHOD FOR SPATIALLY REFERENCING IMAGES

(71) Applicant: Google Inc., Mountain View, CA (US)

(72) Inventors: Alexander Thomas Starns, Redwood City, CA (US); Arjun Raman, Mountain View, CA (US); Gadi Royz, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 16/299,616

(22) Filed: Mar. 12, 2019

(65) Prior Publication Data

US 2019/0205697 A1    Jul. 4, 2019

Related U.S. Application Data

(63) Continuation of application No. 15/642,827, filed on Jul. 6, 2017, now Pat. No. 10,262,231, which is a
(Continued)

(51) Int. Cl.
*G06K 9/62* (2006.01)
*G06T 17/00* (2006.01)
(Continued)

(52) U.S. Cl.
CPC ............ *G06K 9/6215* (2013.01); *G01C 11/02* (2013.01); *G01C 11/025* (2013.01); *G06T 7/593* (2017.01);
(Continued)

(58) Field of Classification Search
None
See application file for complete search history.

(56) References Cited

U.S. PATENT DOCUMENTS

| 5,497,188 A | 3/1996 | Kaye |
| 6,791,598 B1 | 9/2004 | Luken et al. |
| (Continued) | | |

FOREIGN PATENT DOCUMENTS

| JP | 2008301034 A | 12/2008 |
| WO | 2008010345 A1 | 1/2008 |
| WO | 2008028606 A1 | 3/2008 |

OTHER PUBLICATIONS http://muza-chan.net/japan/index.php/blog/google-street-view-on-water; May 14, 2013.
(Continued)

*Primary Examiner* — Frederick D Bailey
(74) *Attorney, Agent, or Firm* — Lerner, David, Littenberg, Krumholz & Mentlik, LLP

(57) ABSTRACT

Provided is a method of spatially referencing a plurality of images captured from a plurality of different locations within an indoor space by determining the location from which the plurality of images was captured. The method may include obtaining a plurality of distance-referenced panoramas of an indoor space. The distance-referenced panoramas may each include a plurality of distance-referenced images each captured from one position in the indoor space and at a different azimuth from the other distance-referenced images, a plurality of distance measurements, and orientation indicators each indicative of the azimuth of the corresponding one of the distance-referenced images. The method may further include determining the location of each of the distance-referenced panoramas based on the plurality of distance measurements and the orientation indicators and associating in memory the determined locations with the plurality of distance-referenced images captured from the determined location.

18 Claims, 11 Drawing Sheets

Related U.S. Application Data continuation of application No. 15/133,836, filed on Apr. 20, 2016, now Pat. No. 9,740,962, which is a continuation of application No. 13/783,878, filed on Mar. 4, 2013, now Pat. No. 9,349,195.

(60) Provisional application No. 61/612,518, filed on Mar. 19, 2012.

(51) Int. Cl.

| | | |
|---|---|---|
| *G06T 7/68* | (2017.01) | |
| *H04N 13/20* | (2018.01) | |
| *G01C 11/02* | (2006.01) | |
| *H04N 5/232* | (2006.01) | |
| *G06T 7/593* | (2017.01) | |

(52) U.S. Cl.
CPC ............... *G06T 7/68* (2017.01); *G06T 17/00* (2013.01); *H04N 5/23238* (2013.01); *H04N 13/20* (2018.05); *G06T 2207/10012* (2013.01); *G06T 2207/30244* (2013.01)

(56) References Cited

U.S. PATENT DOCUMENTS

| | | |
|---|---|---|
| 2002/0030679 A1 | 3/2002 | McDowall et al. |
| 2003/0176986 A1 | 9/2003 | Dietsch et al. |
| 2007/0122058 A1* | 5/2007 | Kitaura ............... G06T 7/579 382/284 |
| 2008/0106593 A1* | 5/2008 | Arfvidsson ........... G06T 3/0062 348/39 |
| 2008/0291217 A1 | 11/2008 | Vincent et al. |
| 2009/0190001 A1 | 7/2009 | Cheimets |
| 2010/0174507 A1 | 7/2010 | Vogel et al. |
| 2010/0177160 A1 | 7/2010 | Tocher et al. |
| 2010/0265327 A1 | 10/2010 | Niem et al. |
| 2012/0043471 A1 | 2/2012 | Harpring et al. |
| 2012/0306913 A1* | 12/2012 | Fialho ............... G06T 3/4038 345/629 |
| 2013/0103303 A1 | 4/2013 | Lynch |
| 2013/0104073 A1 | 4/2013 | Bowditch et al. |
| 2014/0301633 A1 | 10/2014 | Furukawa et al. |

OTHER PUBLICATIONS

Laser Dolphin the sub sea paravan camera for 3D imaging and mapping; www.laseroptronix.se/subsea/laserdolphin.html; May 14, 2013.

Google Earth to Go Underwater; mashable.com/2009/02/02/google-earth-ocean-imagery/; May 14, 2013.

Localization in Indoor Environments Using a Panoramic Laser Range Finder; Tobias Einsele; Oct. 1, 2002.

Kim et al., "Projective Texture Mapping with Full Panorama, "Eurographics 2002, vol. 21, No. 3 (2002).

\* cited by examiner

APPARATUS AND METHOD FOR SPATIALLY REFERENCING IMAGES

CROSS REFERENCE TO RELATED APPLICATIONS

The present application is a continuation of U.S. patent application Ser. No. 15/642,827, filed Jul. 6, 2017, which is a continuation of U.S. patent application Ser. No. 15/133,836, filed Apr. 20, 2016, and issued as U.S. Pat. No. 9,740,962 on Aug. 22, 2017, which is a continuation of U.S. patent application Ser. No. 13/783,878, filed Mar. 4, 2013, and issued as U.S. Pat. No. 9,349,195 on May 24, 2016, which claims the benefit of the filing date of U.S. Provisional Patent Application No. 61/612,518 filed Mar. 19, 2012, the disclosures of which are incorporated herein by reference.

BACKGROUND

1. Field of the Invention

The present invention relates generally to cameras and, more specifically, to techniques for spatially locating images from cameras based on distance measurements to features in the images.

2. Description of the Related Art

Often, users of electronic devices, such as personal computers and smart phones, wish to view on their electronic device the interior of a building or other man-made or natural structure that establishes an indoor space. For example, a device user may wish to view on their device the interior of a store that they are considering visiting, a cave that they are considering exploring, a facility that they are considering renting, or a room about which they are curious, e.g., a room in an art gallery or a museum. Users also often desire to see different views from different locations within these and other indoor spaces. Seeing the indoor space from different perspectives generally provides the user with a more accurate sense of the layout, features, and other attributes of the indoor space than an image from a single perspective.

Indoor spaces are sometimes characterized with spatially-referenced images, which in many instances, depict the interior of the indoor space from different locations. Generally, the different locations are associated with the images such that images may be selected, arranged, or otherwise presented based on (e.g., based at least in part, or based solely on) the location from which they were captured. In some instances, users of electronic devices may tour or otherwise explore an indoor space by viewing images from different locations within the indoor space and virtually moving through the space by selecting different locations near the location from which they are currently viewing the indoor space.

In some systems and some use cases, it is difficult to determine the location from which an image is captured within an indoor space. Indoor spaces are typically more challenging to spatially reference than outdoors, where location is often determined based on global positioning satellite signals or based on the wireless environment. But indoors, these location-indicating signals are often attenuated, impeding efforts to identify the location from which an image is captured. And other techniques for identifying the location of images within an indoor space are often expensive. For example, the location of a camera may be measured relative to some reference point by manually measuring distances to the reference point with a measuring tape, but this technique is often slow and labor intensive. In another example, location may be determined by scanning substantially all of the surfaces within the room from the location of the camera in order to form a three-dimensional map of the room and identify the position of the camera within that three-dimensional map, but three-dimensional scanning systems are often expensive relative to the cost of the camera due to the complexity of the hardware used to scan the room and process the scan data. Consequently, locating images within indoors spaces is often expensive, either due to the cost of labor or the cost of the equipment.

SUMMARY

In some aspects, the present invention includes a method of spatially referencing a plurality of images captured from a plurality of different locations within an indoor space by determining the location from which the plurality of images were captured. The method may include obtaining a plurality of distance-referenced panoramas of an indoor space. The distance-referenced panoramas may each include a plurality of distance-referenced images each captured from one location in the indoor space and at a different azimuth from the other distance-referenced images, a plurality of distance measurements, each distance measurement being indicative of a distance between the location and a feature depicted in a corresponding one of the distance-referenced images, orientation indicators each indicative of the azimuth of the corresponding one of the distance-referenced images, and data associating each of the plurality of distance measurements with the corresponding one of the distance-referenced images and one of the orientation indicators. The method may further include determining the location of each of the distance-referenced panoramas based on the plurality of distance measurements and the orientation indicators, and associating in memory the determined locations with the plurality of distance-referenced images captured from the determined location.

Some aspects include a camera for acquiring spatially-referenced images of indoor spaces. The camera may include one or more cameras each having an optical axis, a camera mount coupled to the cameras and configured to align the optical axes with a plurality of generally radially symmetric directions, each of the radially symmetric directions approximately corresponding to an angular field of view of the cameras, one or more laser range finders each coupled to a corresponding one of the cameras and each oriented approximately parallel to the optical axis of the corresponding one of the cameras, an orientation sensor coupled to the cameras and configured to indicate which of the radially symmetric directions each of the cameras is facing, one or more processors communicatively connected to the laser range finders and the cameras, and memory communicatively connected to the processors. The memory may store instructions that when executed by the processors cause the following to occur: storing images captured by the cameras in the memory; storing distances measured by the laser range finders between the laser range finders and features depicted in the images; storing orientation indicators measured by the orientation sensor, the orientation indicators indicating an orientation of each of the optical axes at the time the images are captured; and associating in the memory the images stored in the memory with the distances stored in memory and the orientation indicators.

Some aspects include a method of determining the location from which images were captured. This method may include obtaining a plurality of distance-referenced images, each distance-referenced image captured from a different position among a plurality of positions, and each distance-referenced image associated with two or fewer distances and two or fewer orientations, determining the locations of the plurality of positions in a shared coordinate system based on the two or fewer distances and the two or fewer orientations, and associating the determined locations with corresponding images of the distance-referenced images in spatially-referenced images stored by a spatially-referenced image repository.

BRIEF DESCRIPTION OF THE DRAWINGS

The above-mentioned aspects and other aspects of the present techniques will be better understood when present application is read in view of the following figures in which like numbers indicate similar elements.

Figure 1:
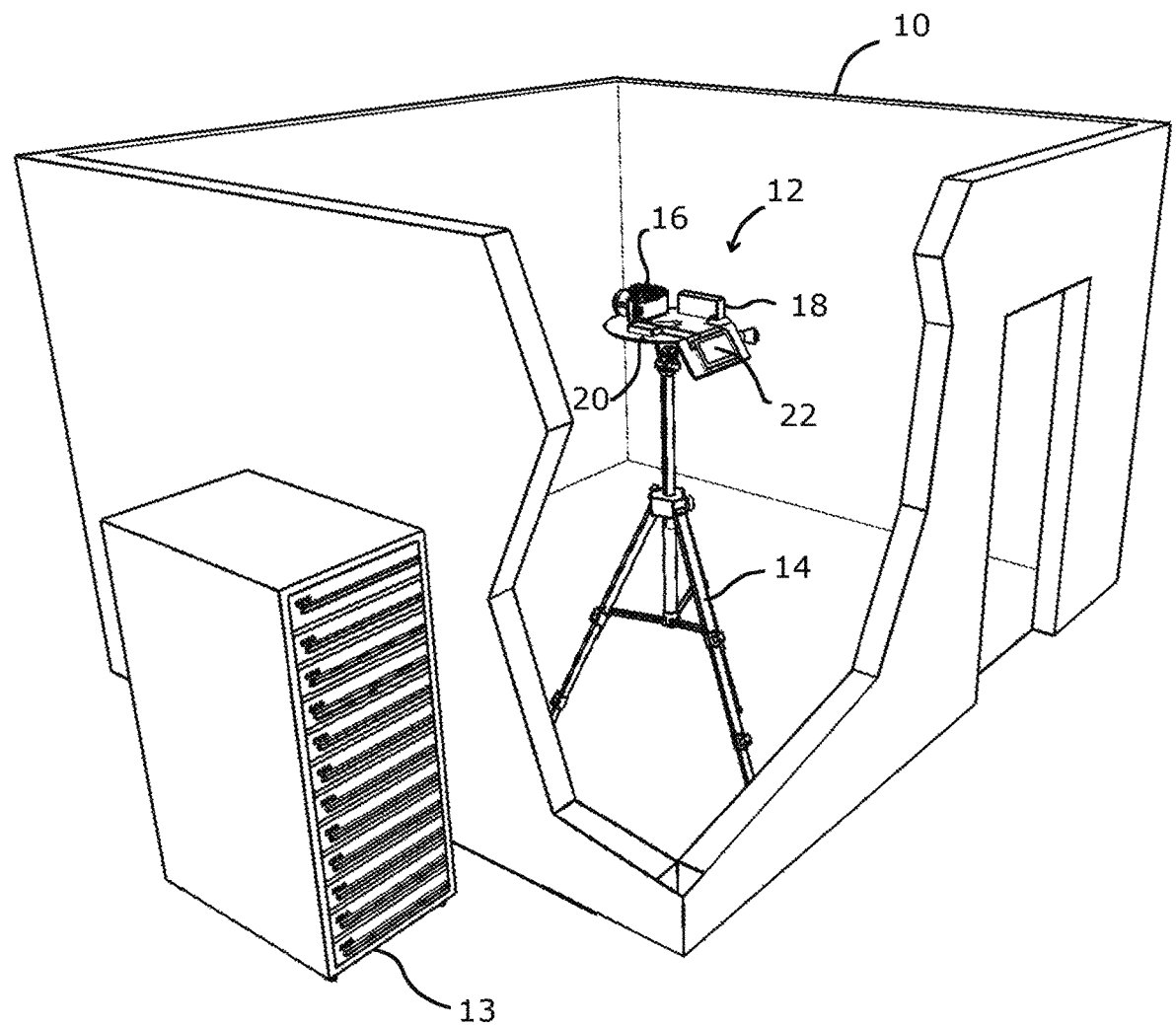
FIG. 1 illustrates a cutaway example of an indoor space, an embodiment of a tour server, and an embodiment of a distance-referencing camera for acquiring distance-referenced images of indoor spaces.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

FIG. 1 illustrates an embodiment of an indoor space 10, a distance-referencing camera 12 for acquiring distance-referenced images of an indoor space, and a tour server 13. (Tour server 13 is depicted near the camera 12 in FIG. 1, but in many applications, would be geographically distant.) In some embodiments, as explained further below, the distance-referencing camera 12 may be configured to obtain panoramic images of the interior of indoor spaces and to obtain data indicative of the locations from which the panoramic images are captured. As explained below, the data indicative of the locations from which the panoramic images are captured may be acquired with relatively little effort and using relatively inexpensive hardware.

In some instances, the distance-referencing camera 12 may be configured to obtain, for each panoramic image ("panorama"), a relatively small number of distance measurements of the distance between the distance-referencing camera 12 and the walls of the indoor space 10, for example 12 or fewer, 8 or fewer, or 1 distance measurement, and to store those distance measurements with captured images (e.g., a panorama or constituent images of a panorama), such that the location within the indoor space 10 from which the images were captured can be determined based on the relatively few distance measurements. Advantageously, in some embodiments, the distance-referencing camera 12 may be operable to obtain data from which spatially-referenced panoramas may be created, as described below, without incurring the above-mentioned costs associated with manually measuring the location of the distance-referencing camera 12 or sensors for performing a three-dimensional scan of the indoor space 10. It should be noted, however, that not all embodiments necessarily provide these benefits, and these and other embodiments may offer other advantages, some of which are described below.

The illustrated indoor space 10 is a room of a building. The invention, however, is not limited to rooms of buildings, as some of the present techniques are applicable in situations in which it is otherwise difficult to determine the location from which a panorama is captured. The term "indoor space," herein, includes the interior of buildings and spaces in which global-positioning system (GPS) signals or other external references from which location can be determined are not available or are not of adequate strength. For example, for purposes of this application, an exterior courtyard, street, or alley, surrounded on several sides by walls or buildings may constitute an indoor space due to weak GPS signals. In another example, underwater areas, such as aquariums and near coral reef beds, may constitute examples of indoor spaces due to weak GPS signals under water.

Figure 2:
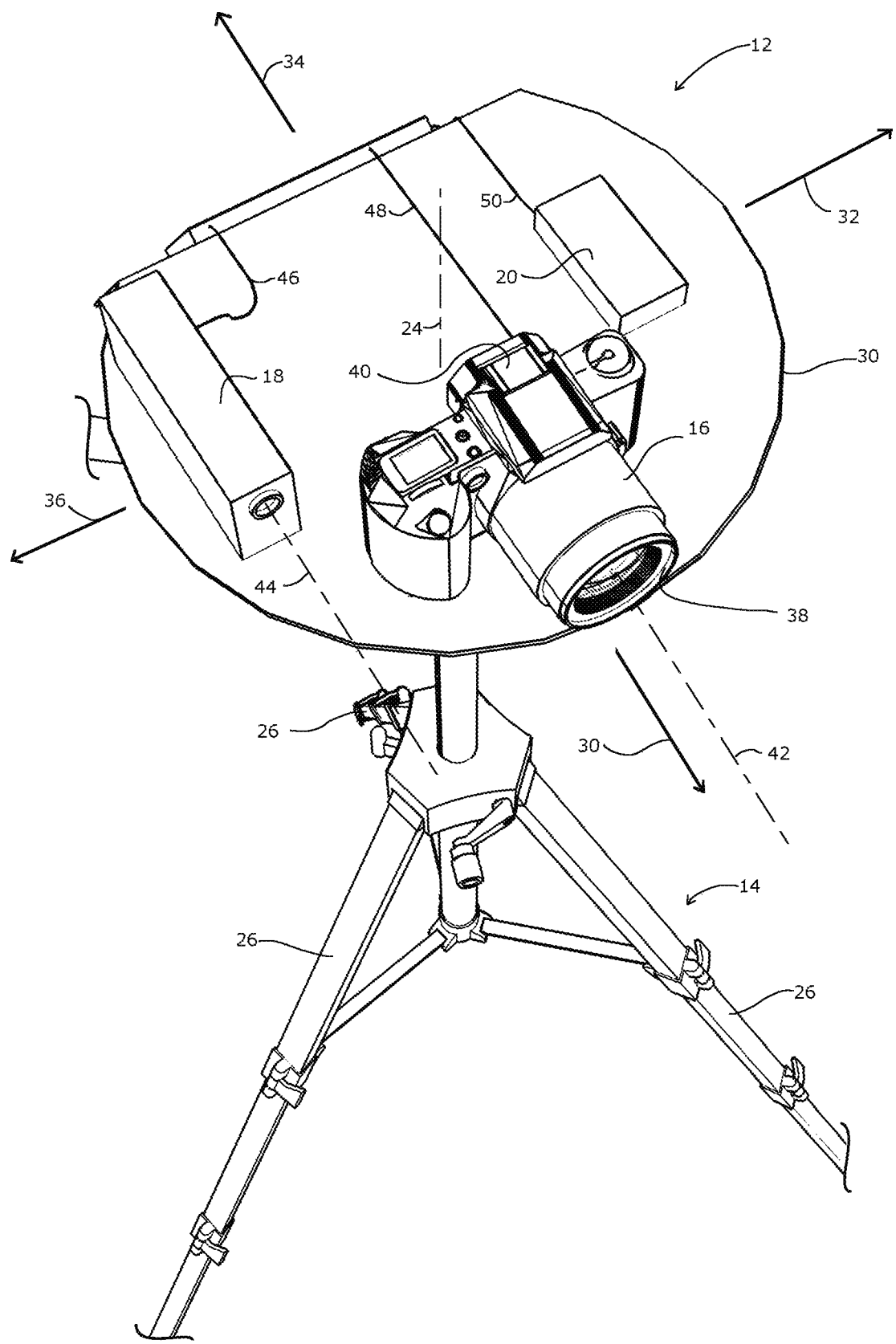
FIG. 2 illustrates additional details of the example of a distance-referencing camera of FIG. 1.

As illustrated in FIGS. 1 and 2, in this embodiment, the distance-referencing camera 12 may be mounted on a camera mount 14 and may include an optical camera 16, a distance sensor 18, an orientation sensor 20, and a mobile electronic device 22. As explained in greater detail below, the distance sensor 18 and the orientation sensor 20 may measure distance and orientation, for example a single distance measurement and a single orientation measurement, when the optical camera 16 captures an image (e.g., in this context, at the same time, in response to, or while in the same positions as when the optical camera 16 captures an image). The distance sensor 18, in some embodiments, may measure a distance between the distance sensor 18 and a feature imaged by the camera 16, such as a wall of the indoor space 10, and the orientation sensor 20 may measure the orientation of the optical camera 16, for example the angular position of the camera 16 about a vertical axis 24, as explained below with reference to FIGS. 5-7 and 10. As is explained with reference to FIGS. 2 and 3, the measured distance and orientation may be stored, e.g., by the mobile device 22, and associated in memory with the captured image. And as explained in greater detail below with reference to FIGS. 8 and 9, the stored orientation and distance data may then be used to determine locations of the distance-referencing camera 12 within the indoor space 10 from which images are captured. In some embodiments, these locations may be associated with the images, and users may view the images and navigate from location-to-location within the indoor space, as explained below with reference to FIG. 11.

The camera mount 14, in this embodiment, includes three height-adjustable legs 26, a central shaft 28 that may be coaxial with the vertical axis 24, and a mounting plate 30. In some embodiments, each of the legs 26 may include a wheel mounted to a distal end of the leg 26 for rolling the camera mount 14. Other embodiments may include more or fewer legs 26, and some embodiments may not include a camera mount 14, which is not to suggest that any other feature described here is required in every embodiment.

The mounting plate 30, in this example, may be a generally rigid structure coupled to the camera mount 14 with 1 degree of freedom relative to the rest of the camera mount 14. For example, the mounting plate 30 may be configured to rotate about the vertical axis 24. In other embodiments, the mounting plate 30 may have additional degrees of freedom, for example the mounting plate 30 may tilt about horizontal axes. In some embodiments, the mounting plate 30 may be configured to indicate certain orientations of the mounting plate 30 relative to the camera mount 14. For example, the mounting plate 30 or other structure on the camera mount 14 may include ridges, detents, cams, mechanical stops, recesses, holes, magnets, or other structures that interact to mechanically indicate when the camera mount 30 is oriented in each of the four directions 30, 32, 34, and 36.

Each of the four directions 30, 32, 34, and 36 may be generally perpendicular to the vertical axis 24, and the four directions 30, 32, 34, and 36 may be generally radially symmetric about the vertical axis 24, having angles (in the pictured example, azimuths) between each of the directions 30, 32, 34, and 36 that are generally equal. Other embodiments may include mechanical indicators of additional directions that are generally radially symmetrically disposed about the vertical axis 24, such as 3, 6, 8, 12, or more directions. The directions may also be referred to as mechanically indicated or preferred azimuths. Some embodiments may also include mechanically indicated or mechanically preferred altitude angles, or rotations about a horizontal axis.

In operation of the present embodiment, as described in greater detail below, the mounting plate 30 and camera 16 may be pointed in each of the directions 30, 32, 34, and 36 before capturing an image from each orientation at a given position in the indoor space 10. The number of directions may be selected based on the field of view of the camera 16 such that the angular distance between each direction is approximately equal to or smaller than a horizontal field of view of the camera 16. By orienting the camera 16 in each of the directions 30, 32, 34, and 36 and capturing an image in each of these directions, a 360-degree horizontal panorama of the indoor space 10 may be obtained by combining, e.g., stitching, the acquired images, as described further below.

The mounting plate 30 may include a threaded bolt extending vertically generally parallel to the vertical axis 24, and which may mate with a threaded aperture in a bottom portion of the camera 16. The camera 16 in this embodiment is secured to the mounting plate 30 (e.g., releasable secured or permanently secured with zero degrees of freedom) and is a single lens reflex (SLR) camera. Other embodiments may use other types of cameras, such as a cell-phone camera, e.g., the wireless device 22 and the camera 16 may be integrated. For example a point-and-shoot camera. Other embodiments may include two cameras in spaced relation to capture stereoscopic images, and some embodiments may include a camera with a plenoptic lens to gather image data by which focal lengths may be later selected or distances may be determined.

In some embodiments, the mounting plate 30 and attached components may rotate about vertical axis 24, which while not depicted in FIG. 2, may pass through or near an optical pupil of the camera lens 38. Such an arrangement is expected to reduce or eliminate parallax between adjacent images. Or in some embodiments, the vertical axis 24 may not pass through the pupil, as illustrated in FIG. 2, and a certain amount of parallax may be encountered.

The illustrated camera 16 includes a lens 38, which may be a wide angle lens, in some embodiments, for example a lens having a focal length less than or equal to approximately 35, 28, 24, 21, 20, 18, or 14 mm or less. In some embodiments, the camera 16 may also include a hot shoe 40 upon which a flash may be mounted. Alternatively, or additionally, the distance sensor 18, the orientation sensor 20, or both may be mounted to the hot shoe 40. In some embodiments, the mounting plate 30 may be omitted (which is not to suggest that other features may not also be omitted), and the camera 16 may be mounted directly to the camera mount 14 with the distance sensor 18 and the orientation sensor 20 mounted to the hot shoe 40. In some embodiments, power, commands, or both may be communicated to the distance sensor 18 via the hot shoe 40, e.g., the camera 16 may be configured to fire a flash when capturing an image, which may cause an electrical signal to be transmitted to the hot shoe 40. The distance sensor 18 may be communicatively coupled to the hot shoe 40, and in response to receiving this electrical signal from the hot shoe 40, the distance sensor 18 may measure a distance. Additionally, the camera 16 of this embodiment has an optical axis 42 that generally defines the direction in which the camera 16 is pointing and generally corresponds to the center of the field of view of the camera 16.

The distance sensor 18, in this embodiment, is a laser rangefinder that, in some embodiments, is configured to emit one and only one beam of laser light along a path 44 (though that one beam may be temporally interrupted as several pulses of the same beam, or some embodiments may emit one pulse of one beam per measurement). The direction of path 44 may be generally fixed relative to the distance sensor 18, the camera 16, and the mounting plate 30, such that the beam emitted along path 44 does not scan or raster or otherwise change orientation relative to the distance sensor 18. Single beam laser range finders that are not configured to scan an entire room are generally less expensive than other equipment configured to scan a surface, such a laser scanners that form a three-dimensional map of a room, for example by rastering or otherwise scanning a beam over the interior of the indoor space. The distance sensor 18, in some embodiments, may be a time-of-flight laser rangefinder that emits a laser light pulse towards a measured feature, for example a wall of the indoor space 10 of FIG. 1, and measures the time taken by the pulsed light to be reflected back to the laser rangefinder. In some embodiments, the distance sensor 18 may determine the distance to the measured feature based on the time of flight by multiplying the speed of light (e.g., the speed of light in the atmosphere) by the time of flight. In some embodiments, the distance sensor 18 is an ultrasound or other sonic rangefinder configured to emit a sound and calculate distance based on duration to an echo from the emitted sound. Sonic distance sensors are expected to be particularly suitable for underwater measurements. The distance sensor 18 may also be configured to determine an error estimate for a measured distance that indicates a tolerance within which the actual distance lies around the measured distance within some probability, for example more than 70%, 80%, 90%, or 95%. In some embodiments, the error tolerance may be less than 10 cm, less than 1 cm, or less than 1 mm. Some embodiments may be configured to make several measurements to a given feature along a single path and average or otherwise combine those measurements.

Other embodiments may include other types of sensors. For instance, some embodiments may include a location sensor having a wireless signal receiver, e.g., a WiFi™ wireless network interface or cellular interface, and location may be determined, e.g., in part, based on received wireless signals. For example, a locating module (either as part of the camera 16, device 22, or as part of remote locating service) may determine (e.g., triangulate) an estimated position based on the current wireless environment, which may include wireless beacons transmitted by base stations of known locations. The determined location may have a relatively large tolerance, e.g., several meters in radius or less, relative to the actual location, and the determined location may be refined based on the other techniques described herein. For instance, the determined location may be accurate within 1 meter, and a more accurate location (e.g., within 10 cm of the actual location) may be determined based on the distance measurements described herein.

The orientation sensor 20, in this embodiment, may be an electronic compass, such as a magnetometer or other device configured to indicate the direction in which the camera 16 is pointing, for example the azimuth of the camera 16, or direction in a horizontal plane perpendicular to the vertical axis 24, such as an accelerometer or gyroscope configured to sense and integrate rotation about a vertical axis. The orientation sensor may be secured to the mounting plate 30, to the hot shoe 40, or otherwise coupled to the camera 16 such that the orientation sensor 20 is operable to indicate the direction in which the camera 16 is pointing. The indicated orientation may be an absolute horizontal orientation, e.g., North, South, East, or West, or a relative orientation, e.g., 20-degrees clockwise (when viewed from above) from an arbitrarily selected orientation, such as a direction perpendicular to the first wall photographed. A tolerance for the orientation measurement may also be measured, e.g., based on a strength of the Earth's magnetic field.

The mobile device 22, in this embodiment, may be a smart phone, laptop, tablet computer, or other electronic device operable to communicate with some or all of the other components of the distance-referencing camera 12 and store data from those components. The mobile device 22 may be a hand-held mobile device having a battery for powering the mobile device when grid power is not available. In this embodiment, the mobile device 22 is coupled to the mounting plate 30 and is communicatively connected to the distance sensor 18, the camera 16, and the orientation sensor 20 by cables 46, 48, and 50. In other embodiments, the mobile device 22 may not be mechanically coupled to the rest of the distance-referencing camera 12, and in some embodiments, may communicate wirelessly with the other components of the distance-referencing camera 12.

In some examples, the mobile device 22 may include an interface by which an operator of the distance-referencing camera 12 indicates that a new indoor space to be imaged or is finished being imaged. Further, in some embodiments, an operator may indicate when the position of the distance-referencing camera 12 changes and when an orientation is selected, e.g., a first selected orientation for an indoor space to which panoramas at subsequent positions will be aligned, examples of which are described below. Operators may also enter data about the indoor space, e.g., a name, location, floor, description, or other attributes of indoor space, such as whether the walls of the indoor space are generally orthogonal and whether particular walls are shared between consecutive panorama positions, as described below with reference to FIG. 6.

Figure 3:
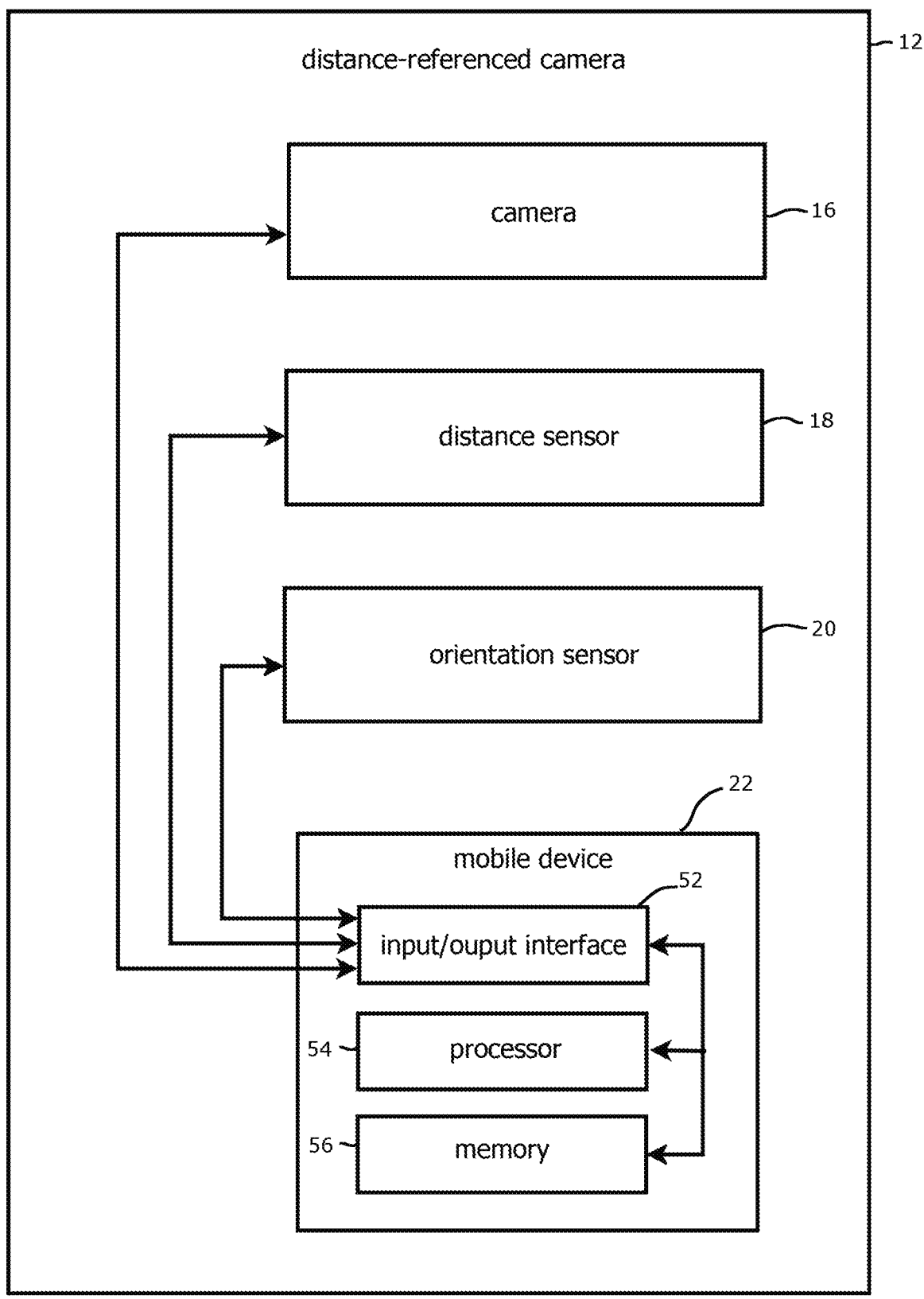
FIG. 3 is a block diagram illustrating components of the exemplary distance-referencing camera of FIGS. 1 and 2.

The operation of the exemplary distance-referencing camera 12 will be described in greater detail below with reference to FIGS. 5 through 6 and 9, but certain operational features are better explained with reference to FIGS. 1-3. In order to capture a panorama from a position, a user may move the distance-referencing camera 12 to that position within the indoor room 10. The user may then orient the camera 16 in a vertical orientation, or altitude, such as an altitude of approximately zero (a horizontal altitude), and a horizontal orientation, or azimuth, such as due North, or some other direction, which is referred to as a selected initial orientation. The selected initial orientation, in some use cases and some embodiments, may be approximately perpendicular or parallel to a wall or most walls in an indoor space, or may be selected based on some other criteria. In some embodiments, subsequent panoramas at different positions within the building may be aligned with the selected initial orientation. The operator may then capture an image in that direction with the camera 16, and the operator may also measure with the distance sensor 18 the distance between the distance sensor 18 and a feature appearing in the image, for example by causing the distance sensor 18 to emit a pulse of laser light and measure the time of flight for the light to be reflected back to the distance sensor 18. While still in the selected initial orientation, the orientation may be measured with the orientation sensor 20 and recorded. In some embodiments, each of the measured distance, the sensed orientation, and the captured image may be transmitted by the distance sensor 18, the orientation sensor 20, and the camera 16, respectively, to the mobile device 22, for example via wires 46, 48, and 50 or via a wireless connection.

In some embodiments, the mobile device 22 may receive the transmitted measured distance, captured image, and sensed orientation, and may store those values in memory. The mobile device 22 may associate the received values with one another, for example by associating each of the values with a timestamp and identifying captured images having the same or similar timestamp as being associated. The received measurements and images may be associated by storing the values within a variety of data structures, e.g., a database, such as a relational database, for instance as members of the same row within a table, or pointers to files, or by storing the values within some other data structure indicative of their association, such as in attributes of an object, portions of a document, or related members of an array. As explained in greater detail below, the stored images and distance and orientation measurements may be used to reconstruct the location of the position from which the image was taken, as explained in greater detail below with reference to FIGS. 8 through 10.

After capturing the first image, the distance-referencing camera 12 may be pivoted about the vertical axis 24 from the orientation 30 to the orientation 32, and the above-described process may be repeated. An image may be captured by the camera 16, a distance may be measured by the distance sensor 18, and an orientation may be measured by the orientation sensor 20. The captured image and the stored measurements may be transmitted to the mobile device 22 and stored as described above. This process may be repeated in each of the directions 30, 32, 34, and 36. The images in each of the directions 30, 32, 34, and 36 may form a panorama, and the association of those images with the distance measurements and orientation measurements in each of the directions 30, 32, 34, and 36 may form a distance-referenced panorama.

Next, in this embodiment, the distance-referencing camera 12 may be moved to another position within the indoor space 10. The distance-referencing camera 12 may be oriented at the new position such that the camera 16, and its optical axis 42, are oriented in the selected initial orientation that was used in the previous position to capture the initial panorama. Once properly oriented, the process described above, by which in this example four images in four directions with four distance measurements and orientation measurements are captured, may be repeated in the new position, thereby forming another distance-referenced panorama in a second position. This process may be repeated as many times as needed to adequately image an indoor space and may be repeated on different floors of a building.

As described in greater detail below, the resulting distance and orientation measurements may be used to convert the distance-referenced panoramas into spatially-referenced panoramas that indicate the location of the distance-referencing camera 12 within the indoor space for each of the panoramas.

In some embodiments, a subset of the above described data may be captured at some positions or at each position. For instance, orientation may only be measured in some of the directions, for instance the first direction of each position, and the distance-referenced camera 12 may be rotated in the same sequence of orientations at each position, such that the sequence of the images indicates their orientation relative to the first image at a position. Similarly, in some embodiments, an image is not captured in each direction, or a distance is not measured in each direction. In some embodiments, a single image is captured at a position, e.g., with vertically oriented camera facing a hemispherical reflector, and the resulting image may be transformed with software into a cylindrical projection depicting a 360 degree horizontal panorama. Or, in some embodiments, a full 360-degree horizontal panorama is not captured, e.g., a 180-degree panorama or a single image with an approximately 90 degree horizontal field of view.

The different positions from which images are captured may be in substantially different, discrete locations. For instance, the locations may each be more than 1-foot apart in rooms in which a relatively high-fidelity is desired, more than 5 feet apart in rooms that are relatively feature dense, or more than 20 feet apart, e.g., in rooms that have a relatively sparse distribution of features.

Before describing example processes for converting distances into locations, additional details of the distance-referencing camera 12 are described with reference to FIG. 3, which illustrates a block diagram of the components of the distance-referencing camera 12. As illustrated, in this embodiment, the optical camera 16, the distance sensor 18, and the orientation sensor 20 are each connected to the mobile device 22. As noted above, the connections may be wired, for example via a universal serial bus (USB) cable, or may be wireless, for example over a Bluetooth™ or WiFi™ connection.

The illustrated mobile device 22 of this embodiment includes an input/output interface 52, a processor 54, and memory 56. The mobile device 22 may be a smart phone, a laptop computer, a tablet computer, or a special-purpose electronic device adapted for interfacing with the other components of the distance-referencing camera 12. The illustrated input/output interface 52 may be a radio, a USB connection, or a combination thereof, depending on the embodiment. The processor 54 may be connected to the input/output interface 52 and the memory 56. In some embodiments, the processor 54 may be a central processing unit having one or more cores. The processor 54 may execute instructions stored on the memory 56 which may be a tangible non-transitory machine readable memory, such as flash memory, random-access memory, or other types of memory. In some embodiments, the processor 54 may be operable to execute instructions stored on the memory 56 that cause the processor 54 to instruct the camera 16 to capture an image, the distance sensor 18 to measure a distance, or the orientation sensor 22 measure an orientation. The mobile device 22 may also include a display screen with a touch interface or buttons by which an operator may select various operations, for example an operation instructing the processor 54 to request an image, a distance measurement, and an orientation measurement. Further, the user interface may receive signals entered by an operator to indicate that the distance-referencing camera 12 has been moved from one position to another location within an indoor space or that the distance-referencing camera 12 has been moved from one indoor space to another indoor space.

In operation, the mobile device 22 may gather the above-described distance-referenced panoramas and data relating to those panoramas, e.g., time stamps, data indicating the sequence of the panoramas, data indicating the identity or location of the indoor space in which the panoramas are acquired, and data indicative of attributes of the indoor space, such as a floor of a building or aspects of the room shape, including whether the floor is sloping, as might occur along a ramp. In certain embodiments, memory 56 of the mobile device 22 may store instructions that cause the processor 54 to effect the processes described herein. The memory or processor related resources and tasks may also be distributed. For example, memory or a processor in the optical camera 16, the distance sensor 18, or the orientation sensor 20 may store some or all of the data described here, e.g., the data acquired by those devices, and perform some of the tasks described here, e.g., in coordinating with processors in other devices. In some embodiments, the memory 56 may be a remote memory, e.g., cloud storage reached via the Internet or network attached storage reached via a local area network, and the input/output interface may transmit data (e.g., the distance-referenced panoramas and related data) to the storage.

The input/output interface 52 may also be operable to communicate with the above-mentioned tour server 13. For example, the interface 52 may transmit the distance-referenced panoramas and related data to the tour server 13, which is described in more detail below. The transmission may occur in batches, e.g., daily, in response to a request by the operator to upload data, or generally continuously as data is acquired, e.g., when data is acquired and a network connections, e.g., a cellular or WiFi™ connection is available. The transmission may be via a variety of networks, including the Internet.

Figure 4:
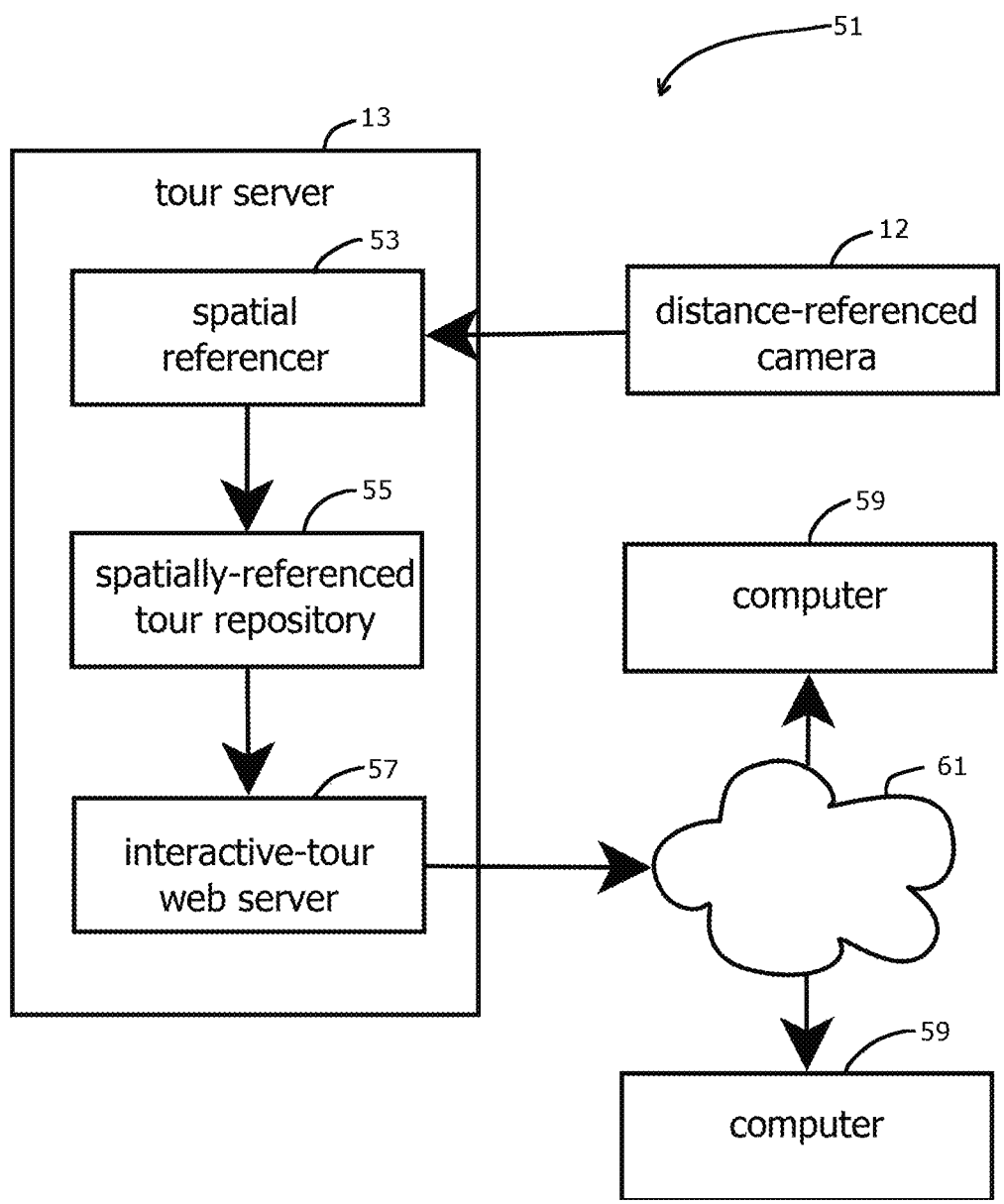
FIG. 4 is a block diagram of the tour server and the distance-referencing camera in a system for providing spatially-referenced images of indoor spaces.

FIG. 4 illustrates an example of a system 51 for providing spatially-referenced images of indoor spaces, which includes the tour server 13 and the distance-referencing camera 12. The tour server 51 may include a spatial referencer 53, a spatially-referenced tour repository 55, and an interactive-tour web server 57, which may serve spatially-referenced images to user computers 59 over the Internet 61. The spatial referencer 53 may receive distance-referenced panoramas and related data from the distance-referenced camera 12, convert the distance-referenced panoramas into spatially-referenced panoramas (e.g., using one or more of the techniques described below), and transmit the spatially-referenced panoramas to the spatially-referenced tour repository 55. The spatially-referenced tour repository 55 may be operable to receive this data, store the data, and respond to queries for the data received from the interactive-tour web server 57 by transmitting responsive data to the interactive-tour web server 57. The interactive-tour web server 57 may be operable to receive requests for spatially-referenced images of indoor spaces from the computers 59, which may be personal computers, other web servers (servers making an application program interface (API) call), smart phones, laptops, or tablet computers, for example. Upon receiving such a request, the interactive-tour web server 57 may, in response, transmit a query for the requested images to the repository 55, receive the responsive images, compose a web page configured to present the images and receive user interaction, and transmit the web page to the computers 59 via the Internet 61. In other embodiments, the data may be sent in other formats, e.g., in special purpose applications that present the data outside of a web browser. Examples of an interface for viewing spatially-referenced images are described below with reference to FIG. 11.

The components of the tour server 13 may each be separate servers, virtual servers operated by the same physical server, or may each include multiple servers that perform the same function, e.g., behind a load balancing server, or multiple servers performing a subset of the functions attributed to each of the components. Further, in some embodiments, the tour server 13 may be a portion of a geographic-information system operable to host sessions in which users view information about geographically distributed objects, e.g., data about such objects overlaid on maps presented in a web browser. In some embodiments, the tour server may be engaged by the geographic information system when a user requests spatially-referenced images of a building identified from the geographic information system.

Figure 5:
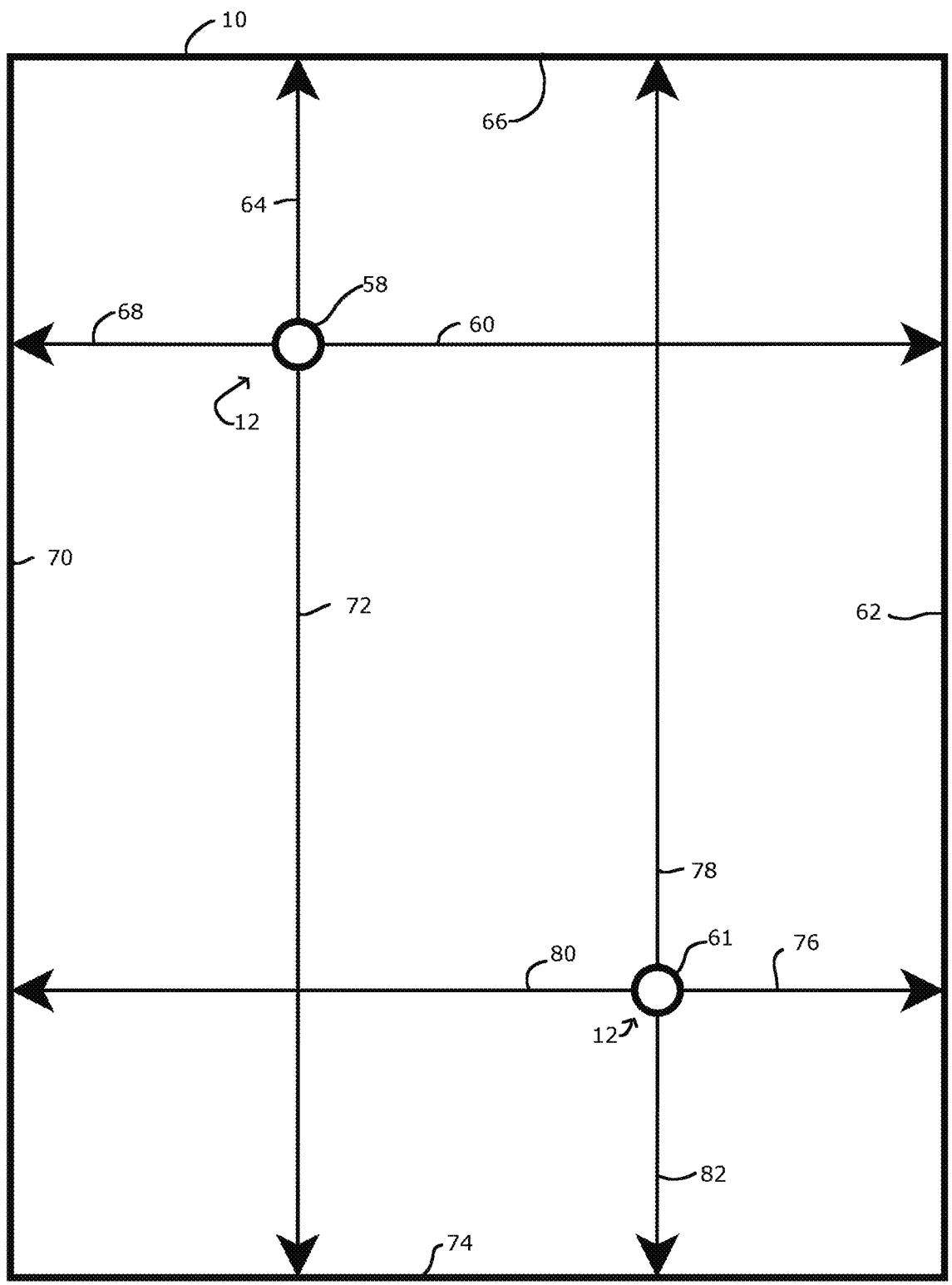
FIGS. 5 through 7 illustrate different configurations of indoor spaces and techniques for operating the exemplary distance-referencing camera of FIGS. 1 through 4.

FIG. 5 illustrates a method of operating the distance-referencing camera 12 within the room 10. In this embodiment, the distance-referencing camera 12 is first moved to position 58. And a user may interact with an interface of the mobile device 22 to indicate that the distance-referencing camera 12 is in a new building or other indoor space that is to be imaged from various positions, for example by interacting with a touchscreen or other user interface of the mobile device 22. Once the distance-referencing camera 12 is that position 58, the user may orient the distance-referencing camera 12 so that the optical axis 42 (FIG. 2) of the camera 16 (FIG. 2) is pointed in an initial selected orientation 60. As noted above, the initial selected orientation 60 may be an arbitrarily selected orientation or may be an orientation used in each building that is imaged, for example due North. In some embodiments in which the initial selected orientation 60 is arbitrarily selected, a user may interact with the mobile device 22 to indicate that the distance-referencing camera 12 is oriented in the initial selected orientation, and in response, the present orientation of the mobile device 12 may be measured by the orientation sensor 20 (FIG. 2), stored in memory 56 (FIG. 3) and designated as the initial selected orientation for the building 10. Next, an image may be captured in the direction 60 and a distance measurement may be taken in the direction 60 to the wall 62 by the distance sensor 18 (FIG. 2). The captured image, measure distance, and measured orientation may be stored in memory 56 (FIG. 3) and associated with one another.

Next, the distance-referencing camera 12 may be oriented in direction 64, which in this embodiment is generally orthogonal to the direction 62, and another image may be captured by the camera 16 and another distance may be measured to a wall 66 by the distance sensor 18. The orientation sensor 20 may also sense an orientation of the camera 12 in the direction 64. In other embodiments, the orientation sensor 20 may not measure an orientation in the direction 64, and the sequence of the images in direction 60 and 64 may indicate the relative orientations, for example, the user may follow a protocol by which the camera 12 is reoriented 90 degrees counterclockwise between each image.

The same or a similar process may be repeated in direction 68 towards wall 70 and in direction 72 towards wall 74. After capturing the image in direction 72, in some embodiments, the user may interact with the mobile device 22 to indicate to the mobile device 22 that the sequence of images at location 58 is complete, or in some embodiments, the mobile device 22 may determine that the sequence of images is complete in virtue of the receipt of four images or some other quantum of images, e.g., 12 images with 4 images in each direction and 3 different exposure durations for each orientation.

Next, the user may move the distance-referencing camera 12 to location 61. At location 61, the user may first orient the distance-referencing camera 12 in direction 76, which is approximately parallel to the initial selected orientation. The user may determine that the distance-referencing camera 12 is oriented in direction 76 based on readings from the orientation sensor 20. For example, the user may request via an interface on the mobile device 22 that the orientation of the distance-referencing camera 12 be indicated on a display screen of the mobile device 22 while the user orients the distance-referencing camera 12. Thus, in this embodiment, the distance-referencing camera 12 is first oriented in the new location 61 in the same direction, for example azimuth or azimuth and altitude, as the first selected orientation used at the first location 58. Next, the user may capture an image in direction 76, measure a distance in direction 76 to wall 62, and measure the orientation of the distance-referencing camera 12 as pointing towards direction 76. This process may be repeated in directions 78, 80, and 82, with images, distance measurements, and orientation measurements captured in each of the directions 76, 78, 80, and 82. The images, distance measurements, and orientation measurements obtained at position 61 may be stored in memory and associated with one another, thereby forming a second distance-referenced panoramic image.

In the embodiment and use case illustrated in FIG. 5, only two distance-referenced panoramas are obtained at positions 58 and 61, but in other embodiments or other use cases, additional positions may be imaged. For example, the room 10 may be imaged at three, four, five, six, or more positions, with each positions resulting in one distance-referenced panorama or other image or set of images. The collection of distance-referenced panoramas may be stored in a list or other data structure with data indicative of the sequence in which the distance-referenced panoramas were captured, and the list or other data structure may be associated with an identifier for indoor space 10 and other data about indoor space 10, such as the examples described above. In some embodiments, an entire building may be associated with a single list of distance-referenced panoramas, or other embodiments or other use cases, multiple lists of distance-referenced panoramas may be associated with the building, for example one list may be associated with each floor of a building. Thus, in some embodiments, a building may be characterized by an array of lists (or a list of lists, if the order in which the floors are imaged is deemed relevant) of distance-referenced panoramas, with each item in the array associated with a particular portion of the building or other indoor space. Some embodiments may include sub-lists (or separate lists) for different portions of a building, e.g., sub-lists or separate lists for different stores within a mall.

As described in greater detail below with reference to FIGS. 8-10, the list of distance-referenced panoramas characterizing an indoor space may be converted into spatially-referenced panoramas. As is apparent from the above discussion, collectively a panorama, data indicating the distance between a position from which the panorama is captured and a feature within the imaged indoor space, and one or more indicators of orientation constitute an example of a distance-referenced panorama. In contrast, a spatially-referenced panorama indicates the location from which an image is captured relative to a coordinate system shared by each of the spatially-referenced panoramas for an indoor space. That is, in some embodiments, each distance-referenced panorama may be transformed into a shared coordinate space such that each panorama is associated with location data indicative of the location of each panorama relative to some point of reference. The point of reference may be an absolute point of reference, e.g., the locations may be expressed in latitude and longitude, or the point of reference may be a relative point of reference, such as the location of the first distance-referenced panorama, which may be defined as an origin of a coordinate system for the spatially-referenced panoramas.

Certain image features (e.g., corners or lines) may be described as being shared between panoramas. In the example of FIG. 5, the four walls 62, 66, 70, and 74 are shared between the panoramas of location 58 and 61. In this embodiment, the distance measurements are taken to the same shared walls, or other structures (e.g., approximately planar surfaces or other structures), in each of the locations 58 and 61. In some embodiments, converting the distance-referenced panoramas to spatially-referenced panoramas may include determining, with for example the spatial referencer 53 (FIG. 4), the number of walls shared between consecutive (or non-consecutive, e.g., non-consecutive but in the same or adjacent rooms) distance-referenced panoramas, which in the example of FIG. 5 is four. Generally, rectangular rooms, such as the indoor space 10, when imaged with the spatially referenced camera 12 will yield four shared walls, absent other interfering structures, such as furniture, or other features. More complicated spaces are described below with reference to FIGS. 6-7 and 10.

In the use case of FIG. 5, position 61 may be determined by designating position 58 as the origin for indoor space 10 and calculating the difference of two distance measurements in two directions from the two positions 58 and 61: e.g., by subtracting the distance measurement in direction 68 from position 58 from the distance measurement in direction 80 from position 61, thereby indicating the relative distance between position 61 and position 58, or the origin, in the directions 60 and 76; and by subtracting the distance measurement in direction 64 from position 58 from the distance measurement in direction 78 from position 61, thereby indicating the relative distance between position 61 and position 58 in directions 82 and 72. These two distances from the origin position 58 constitute an example of a vector indicating the location of position 61 relative to position 58.

In other embodiments, a different origin may be selected, for example the upper left corner of indoor space 10 may be selected, and the location of position 58 may be determined by distance measurement in direction 64 and the distance measurement in direction 68, and the location of position 61 may be determined by distance measurements in direction 78 and in direction 80. Alternatively, or additionally, changes in distances to opposing walls between positions 58 and 61 may be averaged to determine the location of position 61 relative to position 58. For example the difference between distance measurements in directions 68 and 80 may be averaged with the difference of distance measurements in directions 60 and 76 to determine the relative location of position 61 to 58. In other embodiments, other forms of coordinate systems may be used, for example a polar coordinate system may be used by transforming the Cartesian coordinates described above into polar coordinates, for example.

In some embodiments, the number of shared walls in FIG. 5 may be determined, e.g., by the spatial referencer 53 (FIG. 4), based on whether the sum of opposing distance measurements change between positions 58 and 61. In this use case, the distance measurements in directions 60 and 68 are examples of opposing distance measurements as are the measurements in directions 78 and 82. In each of these instances, the measurements are approximately 180 degrees apart from one another, in approximately opposite directions, and characterize the distance between opposing walls of the indoor space 10, in this case walls 66 and 74 being one pair of opposing walls, and walls 62 and 70 being another pair of opposing walls. The combined two distance measurements of opposing distance measurements constitutes an example of a cross-space dimension that approximately indicates the distance between opposing walls. For example, the distances is measured in directions 80 and 76, when summed with one another, approximately indicates the distance across the indoor space 10 from wall 70 to opposing wall 62.

The number of walls shared between positions 58 and 61 may be determined based on (e.g., based solely on or based at least in part on) changes in the cross-space dimensions measured at the positions 58 and 61. For example, if the cross-space dimensions do not change, in response, it may be determined that the walls measured by those measurements have not changed and that at least two walls are shared between the measurements at the two positions 58 and 61. For instance, in the example of FIG. 5, all four walls are shared between measurements at positions 58 and 61, and the cross-space dimensions in directions 64 and 72 are approximately equal to the cross-space dimensions in directions 78 and 82, and the same relationship exists in the orthogonal directions 68 and 60 and 80 and 76 from positions 58 and 61.

Upon determining that four walls are shared, in response, the above described technique for determining location may be executed. Upon determining that less than four walls are shared, other techniques may be used, as described below with reference to FIGS. 6 and 7.

Figure 6:
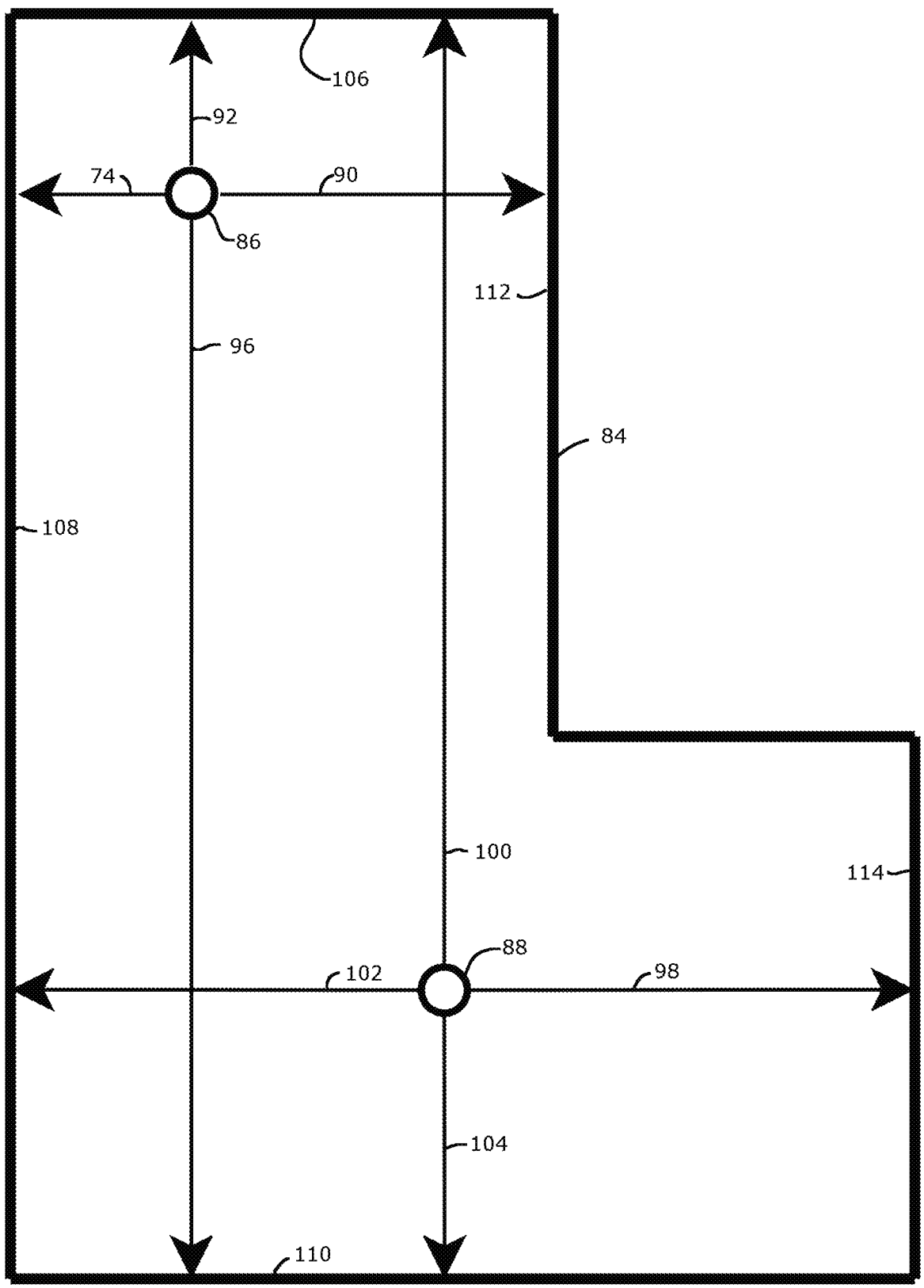

FIG. 6 illustrates another example of an indoor space 84 that is imaged (e.g., panoramas or other images are captured) at positions 86 and 88. In this example, at position 86 images and distance and orientation measurements are taken in directions 90, 92, 94, and 96. Similarly, at location 88, in this example, images and measurements are taken in direction 98, 100, 102, 104. The exemplary indoor space 84 and selection of imaged positions 86 and 88, in this embodiment, results in three shared walls 106, 108, and 110 being shared between positions 86 and 88. Different measurements are taken to wall 112 from position 86 and to wall 114 from position 88, indicating a wall is not shared.

In this use case and embodiment, the location of position 88 may be determined relative to position 86 based on the difference between distances measured in direction 100 and 92 and the difference between the distances measured in direction 74 and 102, e.g., with the above-described technique for calculating a vector between the positions. In some embodiments, the spatial referencer 53 (FIG. 4), or the mobile device 22, upon completing the distance-referenced panorama from location 88 may determine that there are three shared walls between positions 86 and 88 and determine the location of position 88 relative to 86 based on these distance measurements. In some embodiments, it may be determined to only use distance measurements towards the shared walls and to not average differences from opposing distance measurements in response to a determination that only three walls are shared. In some embodiments, upon determining that two of the cross-space dimensions, such as the cross-space dimensions in directions 92 and 96 and in directions 100 and 104, match (e.g., correspond, for instance are approximately equal), and that at least one of the walls 108 and 114 are shared between positions 86 and 88, in response (for example, in response to this determination only or in response to this determination and other factors), the mobile device 22 or spatial referencer 53 may determine which third wall is shared based on image recognition, e.g., of features on the third wall. For example, features appearing on the wall 108, such as windows, corners, or photographs, may be matched between depictions of those features appearing in images captured at position 86 and images captured in position 88. In another example, in response to a determination that two walls are shared, a non-shared wall 114 may be detected based on image recognition, for example by identifying features appearing in an image captured from position 88 in direction 98 that do not appear in an image captured from position 86. Features may be matched by detecting edges in the images, e.g., based on gradients of the intensity of image pixels, and matching similar patters of edges, e.g., by accounting for changes in scale and perspective from the two positions.

Upon determining that three walls are shared and that wall 108 is the shared wall, the location of positions 86 and 88 may be determined based on distance measurements in directions 102 and 100 and 74 and 92, for example using the above described techniques for calculating a vector between positions. Other techniques may be used in use cases or embodiments in which two, one, or no walls are shared between positions. In each of these examples, the relative location in directions in which walls are not shared are may be determined based on image recognition or other data sources that indicate aspects of the layout of the indoor space, as described in greater detail below.

Figure 7:
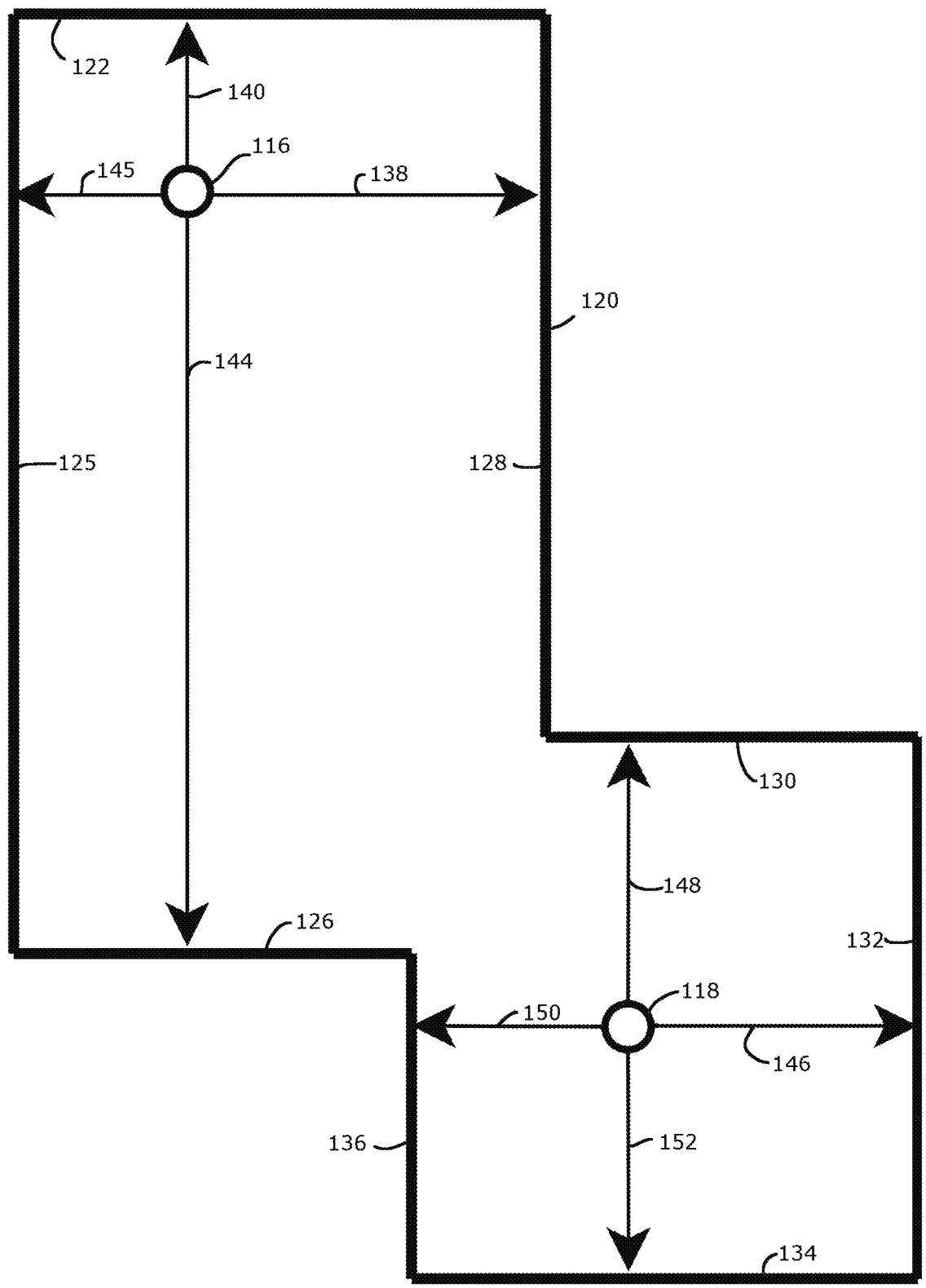

FIG. 7 illustrates a use case in which no walls are shared between imaged positions 116 and 118. In this example, a plurality of panoramas are captured in indoor space 120 having walls 122, 125, 126, 128, 130, 132, 134, and 136. In some use cases, as is the case in the examples of FIGS. 5 and 6, each of the walls is approximately parallel or approximately perpendicular to each of the other walls, and the indoor spaces 10, 84, 120 may be characterized as orthogonal indoor spaces. Also as is the case with certain previous examples, images, distance measurements, and orientation measurements may be captured in four generally radially symmetrically disposed directions from each of the positions 116 and 118: in directions 138, 140, 145, and 144 from position 116; and in directions 146, 148, 150, and 152 from position 118.

As described in more detail below with reference to FIGS. 8 and 9, the locations of distance-referenced panoramas at positions 116 and 118 may be determined based on the captured images, distance measurements, and orientation measurements. For example, in some embodiments, the mobile device 22 (FIG. 2) or the spatial referencer 53 (FIG. 4) may determine whether there are any walls shared between the positions 116 and 118 by comparing cross-space dimensions measured at the two positions 116 and 118. In this embodiment, in the example of FIG. 7, it may be determined that there are zero shared walls, e.g., by selecting the cross-space dimensions in directions 140 and 144 and in directions 148 and 152 (for example based on the orientation measurements matching between those cross-space dimensions or being in generally opposite directions for measurements at a particular position) and comparing the cross-space dimensions to determine a difference between the cross-space dimensions. In this example, the cross-space dimensions in directions 140 and 144 are substantially larger than the cross-space dimensions in directions 148 and 152. The difference between these cross-space dimensions 140, 144 and 148, 152 may be compared to a threshold distance, for example approximately zero, and upon determining that the difference is greater than the threshold distance, in response, it may be determined that the walls are not shared. This process may be repeated in the orthogonal cross-space dimensions in directions 145, 138 and in directions 150, 146, and it may be determined that these walls are not shared either.

Upon determining that the distance measurements do not indicate any of the walls are shared, the locations of positions 116 and 118 may be determined based on image recognition of features appearing in the panoramas captured at that those positions. For example, position 116 may be designated as an origin, for example, based on a timestamp for that position being earlier than a timestamp for the panorama captured at position 118. Next, in this embodiment, features that are visible from both positions 116 and 118 may be identified in the panoramas from each of those positions, and the location of position 118 relative to the location of position 116 may be calculated based on, for example, the size, azimuth, altitude, or other perspective-affected angles of the matched features viewed from the positions 116 and 118.

In some embodiments, upon determining that no walls are shared, the operator may be alerted, e.g., by a user interface of the mobile device 22, to take additional measurements or otherwise gather data indicative of the shape of the space. For instance, an operator may manually measurement distances with a tape measure in this scenario, and the resulting measurements may be entered into the mobile device 22 via the user interface and associated with the images captured from the position being measured.

In some embodiments, upon determining the location of positions 116 and 118, the images captured at those positions 116 and 118 may be associated with the position, as described in greater detail below with reference to FIG. 8. For example, the images captured at position 116 may be associated with a vector of 0, 0, indicating the designation of position 116 as an origin, and the images captured at position 118 may be associated with a vector indicating the distance of position 118 in the direction 138 and in the direction 144 from position 116. In other embodiments, other coordinate systems may be used to indicate location, and the origin may be an absolute reference point rather than a relative reference point, for example the origin in a system of latitude and longitude.

Figure 8:
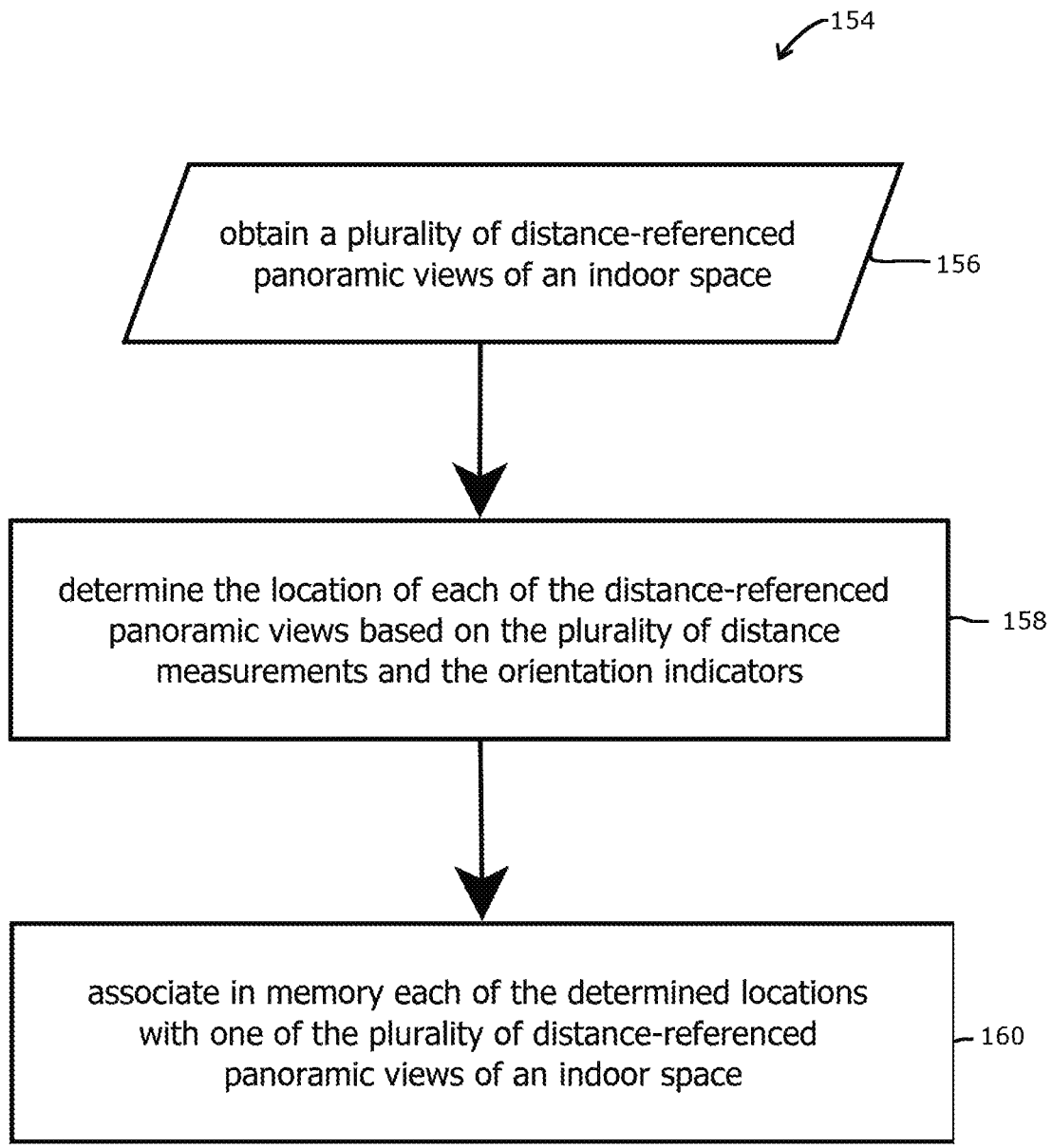
FIG. 8 illustrates an embodiment of a method of spatially referencing a plurality of distance-referenced images captured from different positions within an indoor space.

FIG. 8 illustrates an example of a method 154 for spatially referencing a plurality of images (e.g., a plurality of panoramas) captured from a plurality of different positions within an indoor space. As explained below, the method 154, in certain embodiments, may convert a plurality of distance-referenced panoramas into a plurality of spatially-referenced panoramas based on data that is relatively inexpensive to acquire, for example based on relatively few distance and orientation measurements, such as less than or equal to 12, 8, or 4 measurements taken from each of the positions of the panoramas.

The illustrated method 154 begins with obtaining a plurality of distance-referenced panoramas of an indoor space, as indicated by block 156. Obtaining a plurality of distance-referenced panoramas of an indoor space may include obtaining a sequence of distance-referenced panoramas of the indoor space, each member of the sequence having an indicator that identifies the order in which the panoramas were acquired, or the panoramas may be un-ordered. Further, the distance-referenced panoramas may include panoramas each in the form of multiple images each captured in different directions from a position or in the form of a single image, which may have been captured as a single image or may be formed by stitching together multiple images each captured in a different direction from a position.

The images in the distance-referenced panoramas may each be associated with a distance measurement, the distance measurement indicating (e.g., corresponding to) the distance between the position of the panorama and an object depicted within the panorama, for example a wall, piece of furniture, or some structure that is generally static between panoramas, including a reference structure placed in the panorama for purposes determining position. In some embodiments, the distance measurement may be two or fewer distance measurements for each panorama (e.g., as described below with reference to FIG. 10) indicating the distance, for example, to approximately one or two points on a feature appearing in the image, or each image in a multi-image panorama may be associated with one and only one distance measurement. In some embodiments, each image in a multi-image panorama may be associated with multiple distance measurements, for example fewer than 10, e.g., in use cases in which the labor or hardware costs associated with capturing additional images are less of a factor, or less than 4, for example in use cases in which labor or hardware costs are more important.

In some embodiments, each of the distance-referenced panoramas may also be associated with an indicator of the orientation from which the image was captured, for example data indicative of the direction in which the optical axis of the camera was pointing, such as the azimuth of the optical axis or the azimuth and altitude (which may be expressed in relative or absolute terms). In some embodiments, the orientation indicator may be an azimuth measurement indicating, for example, the azimuth of the optical axis as an angular distance (or rotation) from magnetic North or true North, for instance. The orientation indicator may also be an indicator of the sequence with which the images are captured at a position, for example in embodiments and use cases in which the distance-referencing camera 12 is operated according to a protocol by which the distance-referencing camera 12 is oriented at the selected initial orientation at each position and an image is captured in sequence in each of four directions moving or reorienting the camera 90-degrees clockwise between each image. Thus, in some embodiments, depending on the protocol with which images are captured at each position, the sequence of the images of a multi-image panorama may indicate the orientation, and the sequence may reflect the result of an orientation measurement.

The orientation indicators and distance measurements may each be associated with a corresponding panorama. For instance, each measurement may be associated with one image among a plurality of images making up a multi-image panorama at a position. The association may take a number of forms. For example, each image, or a pointer to the image (such as a uniform resource identifier (URI) or memory address), may be stored in a table in a database in the same entry as the distance measurement and the orientation indicator. In another example, these values may be stored in different tables linked by a key value, such as a timestamp, or the values and images may be attributes of the same object in an object oriented environment. In some embodiments, the images may be associated with the orientation indicator and the distance measurements in other ways, for example the images may be stored in memory in the camera and may be stored with metadata indicating the time at which the images captured, and the distance measurements and the orientation measurements may be stored in memory on the distance sensor and the orientation sensor, respectively, along with timestamps indicating the time at which the distance was measured and orientation was measured. The images may be associated with the distances and the orientations by similar or identical timestamps.

The distance-referenced panoramas may be obtained through a variety of techniques. For example, the plurality of distance-referenced panoramas may be captured with the distance-referencing camera 12, as previously described with reference to FIGS. 1-3. In another example, the plurality of distant-referenced panoramas may be obtained by receiving the distance-referenced panoramas over a network, for example the mobile device 22 (FIGS. 2 and 3) may transmit the plurality of distance-referenced panoramas over the Internet via a wired or wireless connection to a server configured to perform the process 154, such as the tour server 13 (FIGS. 1 and 4), which in some embodiments, is configured to perform the present step with the spatial referencer 53. In another example, the plurality of distance-referenced panoramas may be obtained by obtaining a tangible non-transitory machine readable medium storing the plurality of distance-referenced panoramas, for example a flash drive, a optical media disc, a hard drive, or other storage medium, or by requesting and receiving the distance-referenced panoramas from a remote storage, such as cloud storage or network attached storage.

Next, in this embodiment of the method 154, the location of each of the distance-referenced panoramas may be determined based on the plurality of distance measurements and the orientation indicators, as indicated by block 158. Determining the location of each of the distance-referenced panoramas may be performed with a variety of techniques, including the technique described above and below with reference to FIG. 9 in greater detail, and location may be determined by the processor of the mobile device 22 (FIG. 3), by executing instructions stored in memory, or by the spatial referencer 53 (FIG. 4).

The determined locations may be relative or absolute locations. For example, an origin may be selected from among the plurality of distance-referenced panoramas obtained in step 156, for instance by identifying a earliest panorama having an earliest timestamp. In another example, an origin panorama position may be determined based on a user selecting the origin point, for example a user operating the distance-referencing camera 12 or a user operating or otherwise configuring a server operable to perform the process 154.

In some embodiments, the origin may be selected based on the presence or precision of location information associated with one or more of the distance-referenced panoramas relative to positions outside of the indoor space. For example, the distance-referencing camera 12 may include a GPS module, and one of the distance-referenced panoramas may be obtained from a position in a doorway or near a window from which GPS signals or other signals from which absolute or relative position can be determined with respect to the exterior of the indoor space, such as a latitude or longitude. In some instances, this external location indicator may be associated with a certainty value, for example based on the strength of the signals. The distance-referenced panorama that is associated with the external location indicator, or that is associated with the external-location indicator with the strongest certainty value, may be selected as the origin.

Some embodiments may select multiple origins from among the plurality of distance-referenced panoramas. For example, in some embodiments, the first panorama may be acquired from within or near a doorway where an external location indicator is captured, for example by a GPS module of the distance-referencing camera 12, such as a location module of the mobile device 22, and then, for example six panoramas later, another panorama may be acquired from a position near a large window where another location indicator is captured and associated with that seventh panorama. In this example, the first panorama position may serve as an origin for the next six, and the location of the seventh panorama may serve (e.g., in this context, be selected) as an origin for subsequent panoramas. In another example, the first panorama may serve as the origin for all of the subsequent panoramas within the indoor space, and the external location indicator captured at the seventh panorama may be discarded or maybe used to refine the location of the first panorama with reference to the external location indicator, for example by adding the relative position of the seventh panorama to the external location indicator of the origin, or the first panorama, and then averaging the external location indicators from the two positions. Some embodiments may determine relative locations of each of the distance-referenced panoramas relative to only the selected origin panorama, and all of the distance-referenced panoramas may be associated with a particular external location indicator, for example a latitude and longitude of a building in which the indoor space is disposed.

Some embodiments may refine the locations of the panoramas based on the external location indicator. For instance, in use cases in which external location indicators are obtained at a subset of imaged positions, other positions may be refined based on these external location indicators, e.g., by interpolating positions between members of the subset based on the distance and orientation measurements.

After identifying an origin, in this embodiment, the shape of the indoor space may be characterized by comparing cross-space dimensions between the panoramas. For example, two pairs of matching cross-space dimensions, for instance a measurement from North to South and a measurement from East to West, of distance at a first position and a second position, may indicate that the indoor space is likely rectangular (or can be approximated as being rectangular), and a single pair of matching cross-space dimensions may indicate that two or three walls are shared between consecutive panoramas, as described above.

In this example, in use cases in which four shared walls are identified between consecutive panoramas, a vector may be calculated from the earlier views to the later view based on the difference of the distance measurements in the same orientations at the two different positions. In some embodiments, the resultant vector may be added to the location determined for the earlier panorama to identify the location of the later panorama. In this example, and use cases in which fewer than four walls are shared, other techniques may be used to calculate a vector from the earlier panorama to the later consecutive (or non-consecutive) panorama. For example, features depicted within the two panoramas may be matched to identify the presence of a third shared wall, and upon identifying the third shared wall, the vector from the earlier panorama position to the later panorama position may be calculated based on differences between the distances to the third shared wall from the two positions and the differences to the first two shared walls or one of the first two shared walls from the two positions. Again, in this example, the vector resulting from this calculation may be added to the location of the earlier panorama to determine the location of the later consecutive panorama, thereby transforming the two panoramas to the same coordinate system.

In this example, in use cases in which none of the cross-space dimensions match between consecutive (or non-consecutive) panoramas, in response, it may be determined (e.g., by the spatial referencer 53) that none of the walls are shared between the consecutive panoramas, and the location of the later panorama may be determined based on image recognition of features shared between the earlier panorama (e.g., already located) and the later panorama (e.g., being located) and the location of the earlier panorama. For example, the angular position of features appearing in both of the panoramas from the two different positions, such as the position of corners of walls to which distances are measured, may indicate the position of the later panorama relative to the earlier panorama. In another example, layout information of the indoor space may be obtained, such as a dimensioned layout, e.g., a floor plan or satellite or other overhead view of the exterior of a building, indicating the distance between each of the walls of the indoor space, and the layout information may be compared with the distance measurements to identify the position of the later panorama. For example, cross-space dimensions may be calculated for each room within the indoor space based on the layout information, and the measured cross-space dimensions from the later panorama position may be compared to the calculated dimensions from the layout information to identify a room having matching cross-space dimensions or the most similar cross-space dimensions. The position of the later panorama may then be determined based on the distance measurements to the walls of the identified room and the position of the identified room relative to the origin, for example as indicated by distance measurements obtained at the selected origin.

The above process may be repeated for each panorama among the plurality of distance-referenced panoramas. For example, the location of each panorama may be determined in the sequence in which the panoramas were obtained, for instance based on timestamps of the panoramas, which may include one timestamp for each image in the panorama or one timestamp for the entire panorama. In some embodiments, the location of each panorama may be determined relative to the location of the previous panorama. For example, a vector or other data indicative of the location of the subsequent panorama relative to the earlier panorama may be determined. The vector from the earlier panorama to the later panorama may then be added to a vector between the origin and the earlier panorama to determine the location of the later panorama relative to the origin.

Next, in the present embodiment of method 154, each of the determined locations may be associated with the corresponding one of the plurality of distance-referenced panoramas of the indoor space, as indicated by block 160. This step, in some embodiments, may be performed by the spatially-referenced tour repository 55 of FIG. 4 or the mobile device 22 of FIGS. 1-3. Associating the determined locations with each of the corresponding panoramas transforms the distance-referenced panoramas to spatially-referenced panoramas, which in some embodiments may share a common coordinate system by which the locations of each of the spatially-referenced panoramas are indicated, such as a coordinate system having the above-mentioned selected origin.

The location of each of the panoramas may be expressed as a vector, and the coordinate system may take a variety of forms, including a polar coordinate system or a Cartesian coordinate system. In some embodiments, the vector (e.g., a Euclidean vector) may be expressed as a tuple having two or more scalar components, such as a distance in a first direction and a distance in an orthogonal, second direction; or as a magnitude of a vector in distance and an angular displacement relative to some orientation, such as true North or magnetic North, or the selected initial orientation described above.

In other embodiments, the vector may include additional dimensions, for example an indication of which floor in a multi-floor building the indoor spaces located, which may be a discrete value indicative of the floor or may be a continuous value indicative of the height at which the panorama is captured, for example. In some embodiments, panoramas may be captured from multiple heights on a single floor, for example a floor-level panorama, such as a panorama from 3 feet or less above the floor in the indoor space, an eye-level panorama, for example from between 3 feet and 7 feet above the floor, and a ceiling-level panorama, for example from within 3 feet of the ceiling. In this example, the position vector may include a third value that indicates the height or height-category (e.g., low, medium, and high) from which the panorama was captured. Similarly, a height value in such a vector may be employed when capturing a series of panoramic images along a ramp.

The spatially-referenced panoramas may also be associated with an orientation indicator that identifies a direction depicted within the panoramas, for example an indicator of which portion of the panorama corresponds to North, magnetic North, or the selected initial orientation described above. In some embodiments, an image file in which the panorama is encoded may include an orientation indicator. For example, the panorama may be a rectangular image that corresponds to a cylindrical projection of the room, and the vertical edges of the rectangle may correspond to, and be indicators of, an orientation.

As noted above, the association may take a variety of forms. For example, the orientation indicator, the distance, the image, or pointers to any of these data may be associated with one another in a database, such as a relational database, for example as related entries within a single table or as entries linked by key values in different tables; as a document, for example an extensible markup language (XML) or JavaScript object notation JSON document, stored in a database or other document repository; as data in a memory image; or as attributes of the same object stored in memory of a computer performing the method 154, such as the tour server 13 (FIGS. 1 and 4) or the mobile device 22 (FIGS. 1-3).

Figure 9:
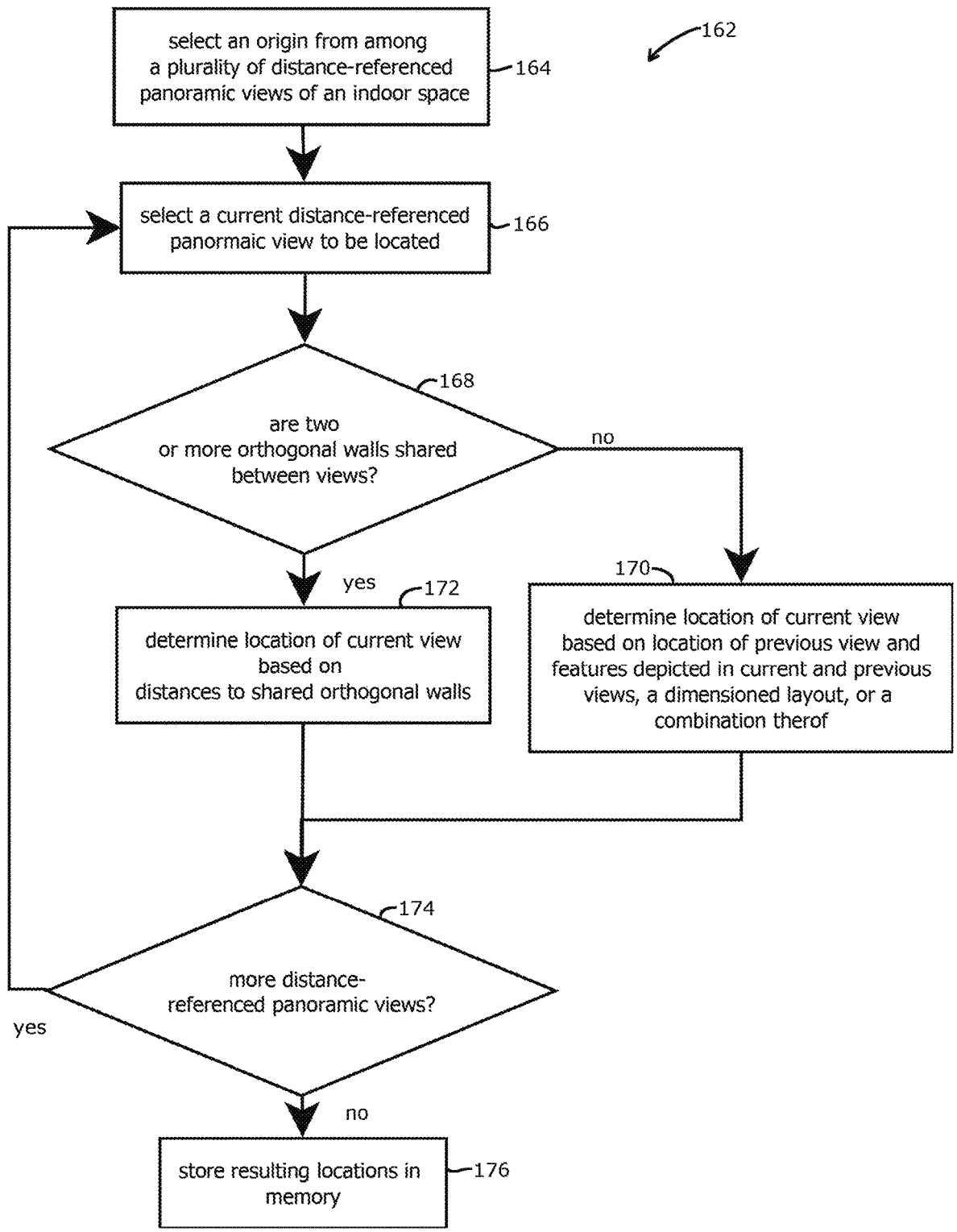
FIG. 9 illustrates an example of a method for determining the location of distance-referenced images from different positions within an indoor space.

FIG. 9 illustrates a method 162 of determining the location of each of a plurality of distance-referenced panoramas. The method 162, in some embodiments, may be performed by the spatially-referenced tour repository 55 (FIG. 4) or the mobile device 22, and the method 162 may be performed as part of the step 158 described above with reference to method 154 of FIG. 8. In some embodiments, the method 162 may be preceded with a step of determining whether an indoor space is an orthogonal indoor space for purposes of the method 162, for example whether the walls of the indoor space are generally parallel to one another or generally perpendicular to one another, or whether the walls are substantially curved or at oblique angles to one another. The determination may be performed by a user of the spatially referenced camera 12, for example by entering data in the mobile device 22 indicative of whether the indoor space is a generally orthogonal indoor space, and data indicative of whether the indoor space is a generally orthogonal indoor space may, for example, be associated with the resulting distance-referenced panoramas of the indoor space. Upon determining that the indoor spaces generally orthogonal, in some embodiments, the process 162 may begin. In other embodiments, the process 162 may begin without regard to whether the indoor space is an orthogonal indoor space.

The illustrated process 162 begins with selecting an origin from among a plurality of distance-referenced panoramas of an indoor space, as indicated by block 164. Examples of this selection were described above. Next, in this example, a current distance-referenced panorama may be selected, as indicated by block 166. In some embodiments, as noted above, the earliest distance-referenced panorama may be selected as the origin, and the current distance-referenced panorama may then be selected as the next panorama that has not yet been processed with the method 162. For instance, the earliest panorama based on timestamp may be selected.

Next, in the present embodiment of method 162, it may be determined whether two or more orthogonal walls are shared between views, as indicated by block 168. The process 162 may include determining whether walls are shared between the previous distance-referenced panorama process with the method 162 and the current distance-referenced panorama. As noted above, shared walls may be determined based on the cross-space dimension measured in each orientation at the previous distance-referenced panorama and the current distance-referenced panorama. Differences between the cross-space dimensions in a particular orientation at each of the positions may indicate that different walls are measured at the different positions and that the walls are not shared.

Upon determining that two or more orthogonal walls are not shared between views (e.g., solely upon this determination or upon this determination and other criteria), in response, the process 162 may proceed to determine the location of the current view based on the location of the previous view and features depicted in the current and previous views, a dimensional layout of the indoor space, or a combination of this data, as indicated by block 170. As noted above, in some embodiments, information relating to the relative location of consecutive panoramas may be obtained based on the position and size of features recognized in both of the panoramas. For example, edges may be detected in each of the panoramas, and matching edges, for instance edges with similar gradients or similar patterns of other edges nearby, may be matched between the panoramas, and the relative positions may be triangulated. In some embodiments, triangulating the relative position of the consecutive panoramas may include detecting a feature on a wall to which a distance is measured in one of the panoramas, such as edges or corners of the wall, and triangulating the position based on the measured distance. In some embodiments, the relative position may be determined based on multiple walls and multiple distances.

Alternatively, or additionally, the position of the current panorama may be determined based on a dimensional layout of the room, such as a plan view indicating the location and dimensions of walls or other structures within the indoor space or an overhead image of the building in which the indoor space is disposed, e.g., a satellite image. As noted above, the cross-space dimensions indicated by the distance measurements associated with the current panorama may be matched to dimensions of rooms in the dimensional layout to identify a room within which the panorama was captured. After identifying the room, the location within the room may be determined based on distance measurements to walls of the room associated with the panorama, and the location of the room relative the origin may be determined based on the dimensional layout. The location of the room and the location of the panorama within the room may be combined, for example added as vectors, to determine the location of the current view relative to the origin.

In this embodiment of method 162, upon determining that two or more orthogonal walls are shared between panoramas, in response, the method 162 may proceed to determine the location of the current panorama based on differences in distances to orthogonal walls shared between the panoramas, as indicated by block 172. As described above, in some embodiments, the position of the current view relative to the previous view may be determined based on differences of distances to shared walls between the two views. The vector between the previous view and the current view may be added to a vector between origin and the previous view to determine the location of the current view.

Next, in the method 162 of this embodiment, it may be determined whether there are more distance-referenced panoramas among the plurality of panoramas to be spatially referenced, as indicated by block 174. Upon determining that there are no more distance-referenced panoramas to process, the method 162 may proceed to block 176, and the resulting locations may be stored in memory. In some embodiments, as noted above, storing the results in memory may include associating in memory each of the determined locations with one of the plurality of distance-referenced panoramas, as indicated in block 160 of FIG. 8.

Upon determining that more distance-referenced views among the plurality have not been processed with the method 162, in response, the method 162 may return to block 166, and the next current distance-referenced panorama to be located may be selected. The next current distance-referenced panorama may be the next panorama that has not been processed in a sequence indicated by the timestamps associated with the panoramas, in some embodiments. Thus, the distance-referenced views may be spatially referenced by the model 162, and as explained below with reference to FIG. 11, the spatial references may impart additional meaning and descriptive value to a user viewing the panoramas relative to non-spatially referenced panoramas.

As noted above, some of the present techniques determine location by modeling the indoor space as an orthogonal indoor space. Not all embodiments, however, use this model. For instance, FIG. 10 illustrates an embodiment of an indoor space 178 that is non-orthogonal. As illustrated in FIG. 10, walls 180, 182, 184, and 186 are substantially curved.

In this example, distance measurements may be taken in a different orientation from the orientation in which images are captured, or without regard to the orientation in which images are captured. For example, panoramas may be captured as each of positions 188, 190, and 192 in each of, for example, four different generally radially symmetric directions, for instance in the fashion described above with reference to FIGS. 5, 6, and 7. In some embodiments, one of the directions in which images are captured, for example a first direction, may be in orientation 194, 196, and 198, which are the same orientation lying along generally parallel lines passing through each of the locations 188, 190, and 192. The other images may be obtained, for example, by rotating the distance-referencing camera 90 degrees clockwise or counterclockwise in sequence at each of the positions 188, 190, 192. In some embodiments, a distance measurement is not taken at each orientation, which is not to imply that any of the other measurements here are necessary in all embodiments.

Next, in this embodiment, after acquiring the images for the panorama at a position, for example, at position 188, the distance-referencing camera 12 (FIGS. 1-3) may be oriented towards the next position 190. Once the camera is oriented towards the next position 190, while still at the earlier position 188, an orientation measurement may be taken of angle 200 relative to the initial selected orientation 194 (or some other reference orientation), and a distance measurement 202 may be taken of the distance between position 188 and wall 184 towards the next position 190. The orientation indicator 200 and distance measurement 202 may be stored in memory and associated with the panorama captured at position 188, e.g., as an orientation and distance measurement for locating a subsequent panorama.

Next, the distance-referencing camera 12 (FIGS. 1-3) may be moved from position 188 to position 190. Once in position 190, the distance-referencing camera 12 may be oriented in the same orientation from which the previous distance measurement was taken at angular measurement 204, which may be approximately equal to the angular position, or azimuth, 200. Once properly oriented, another distance measurement 206 may be taken towards wall 184, which may be towards approximately the same point or area on the wall 184 that was measured from position 188 in the same direction. Next, a panorama may be captured from position 190 with the process described above for position 188, and the panorama may be associated with the orientation measurement 204 and the distance measurement 206 (and in some embodiments, the orientation measurement 204), e.g., as a distance measurement for locating the present panorama.

Next, in this embodiment, while still at position 190, the above-described process for measuring in a particular orientation that is aligned with the next position may be used for positions 190 and 192. The distance-referencing camera 12 (FIGS. 1-3) while at position 190 may be oriented towards position 192 and an orientation measurement 208 may be made and associated with the panorama at position 190. Additionally, while at position 190 a distance measurement 210 may be made to wall 212. The distance measurement 210 and orientation measurement 208 may be associated with the panorama at position 190, e.g., as a distance measurement for locating a subsequent panorama.

Next, the camera may be moved in the direction in which the distance measurement 210 was taken, in the direction indicated by orientation measurement 208, to position 192. While at position 192, another orientation measurement 214 may be taken to confirm that the camera while at position 192 is in the same orientation it was in when the distance measurement 210 was taken from position 190. Next, a distance measurement 216 may be captured from position 192 to the wall 212, for instance to approximately the same location on the wall 212 from which the distance measurement 210 was taken from the previous position 190. Next, in this embodiment, a panorama may be captured at position 192 using one of the above-described processes. The distance measurement 216 and orientation measurement 214 may be associated with the panoramas captured at position 192. Together, the distance-measurements and orientation measurements, for example the one orientation measurement or two orientation measurements and one distance measurement or two distance measurements taken at each position, associated with the panoramas at a position from which those measurements were taken, may constitute an example of distance-referenced panorama.

Figure 10:
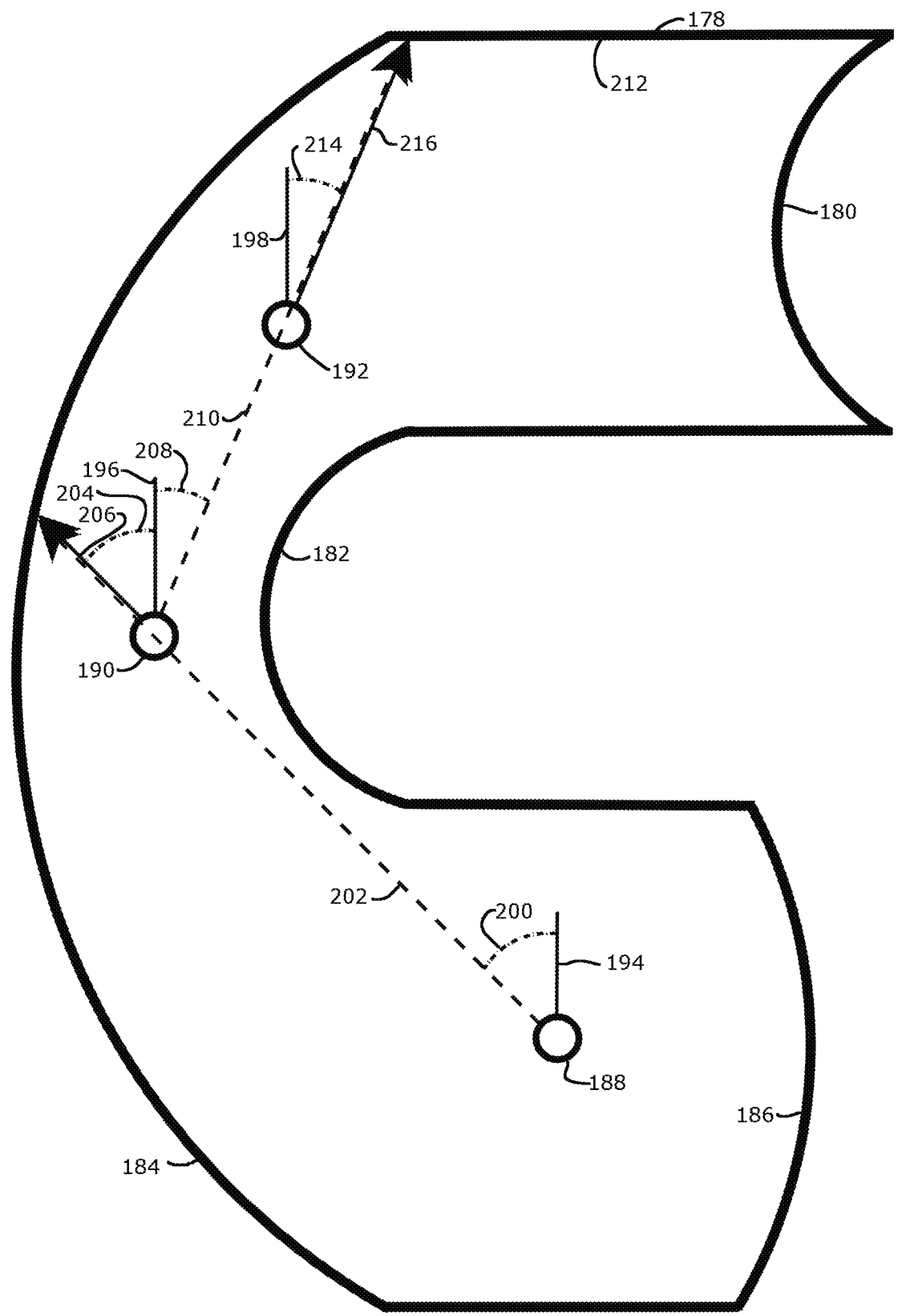
FIG. 10 illustrates another embodiment of a method for determining the location of distance-referenced images from different positions within indoor space.

The distance-referenced panoramas of FIG. 10, in some embodiments, may be converted into spatially-referenced panoramas without regard to whether the walls of the indoor space 178 are orthogonal. For example, position 188 may be designated as an origin, and the location of position 190 may be determined relative to the origin based on the one (e.g., only one) orientation measurement 200 and the one (e.g., only one) distance measurement 202 taken from the previous position 188 and the one (e.g., only one) distance measurement 206 in orientation 204 taken from the subsequent position 190. For example, the location of position 190 relative to the location of position 188 may be expressed as a vector having a magnitude equal to the difference between distance measurements 202 and 206 and having an orientation of orientation measurement 200. In another example, the location of position 190 may be expressed as a vector having orthogonal scalar components (e.g., a tuple) generally equal to the difference between the distance measurements 206 and 202 multiplied by the sine and the cosine of the angle of orientation measurement 200.

Similarly, the location of position 192 may be calculated relative to position 190 based on the difference between the distances 210 and 216 measured along approximately the same path lying generally collinear with a line passing between the locations 190 and 192 at the angle indicated by orientation measurement 208 or 214. The location of position 192 may be determined relative to the origin at position 188 by adding the vector for position 190 the vector for position 192. This process may be repeated indefinitely for additional positions within the indoor space 178. The resulting locations may be associated with the corresponding panoramas and stored in memory as spatially-referenced panoramas as described above, for example with reference to step 160 of method 154 of FIG. 8.

Thus, the technique described above for FIG. 10 may spatially reference distance-referenced panoramas of both orthogonal and non-orthogonal indoor spaces. In some embodiments, the above techniques may be combined for indoor spaces having some orthogonal walls. The technique of FIG. 10 may tend to accumulate errors in location as more positions are determined, while the techniques of FIGS. 5-9 may be generally more accurate over several positions. Thus, some embodiments may employ the techniques of FIGS. 5-9 to suppress the accumulation of errors when positions near orthogonal walls are available.

As noted above, the above techniques, in some embodiments, may spatially reference distance-referenced panoramas. As a result, in some instances, the panoramas may be presented to users based on the spatial references. For instance, users may view a panorama and navigate to another position to view another panorama by selecting the next panorama to view based on the location of the next panorama, e.g., by hopping from one panorama to another through a user-selected or pre-defined tour of a building, an example of which is described below with reference to FIG. 11. Navigating between panoramas based on the location from which the panoramas were captured is believed to impart a more accurate sense of the indoor space to a user viewing the panoramas, as navigating based on location is similar to how a user would walk through and experience the indoor space were the user physically moving through the indoor space. Not all embodiments, however, provide this benefit, and other embodiments may provide other benefits. For example, the spatial references may facilitate feature recognition of objects depicted in multiple panoramas, e.g., a three-dimensional model of the indoor space may be constructed based on a stereoscopic view of the features from two different panoramas, and the spatial references may be subtracted to determine the distance between the two perspectives. In some embodiments, the panoramas may be texture mapped onto these three dimensional models, and views from additional positions, from which panoramas were not captured, may be simulated by depicting the texture-mapped three dimensional model from other viewer positions.

Figure 11:
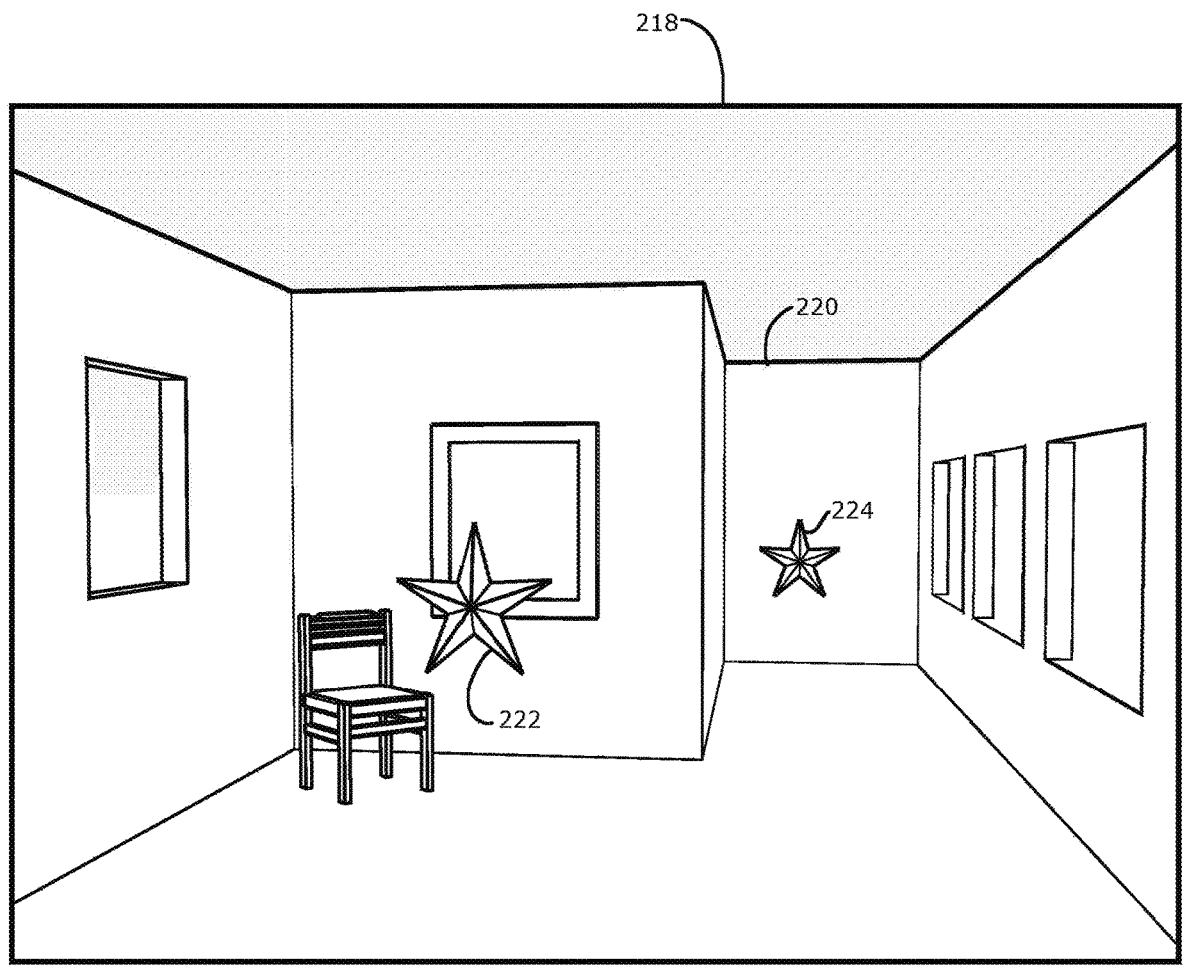
FIG. 11 illustrates an example user interface on a user device for navigating among spatially-referenced images of an indoor space.

FIG. 11 illustrates an example of a user interface 218 for viewing images based on the spatially-referenced panoramas. In some embodiments, the interface 218 may be a viewport of a Web browser rendered on a display of the computers 59 of FIG. 4. In other embodiments, the interface 218 may be a special-purpose application executed on the computers 59 for viewing or processing data from panoramas of indoor spaces. The user interface 218 may depict an portion of a panorama from an position, e.g., a user selected position, and in some embodiments, the user may interact with the interface 218, e.g., by touching and dragging left or right, or clicking and dragging a mouse left or right, and based on the interaction, a different portion of the panorama may be displayed, e.g., dragging left may select an portion of the panorama that is clockwise (viewed from above), and vice versa. In some embodiments, user interaction events may be caught by interface 218, and the interface 218 may transmit a request for responsive image data to the interactive-tour web server 57 (FIG. 4), which may retrieve the requested image from the spatially-referenced tour repository 55 (FIG. 4), and in response, transmit the images to the interface 218, which may then display the images.

FIG. 11 illustrates an indoor space 220 from a simulated viewer position. In some embodiments, the user may select additional viewer positions from which the interface 218 displays the indoor space 220. For instance, the user may navigate through the indoor space 220 to other panoramas based on the locations of the panoramas. In the interface 218, other panorama locations are depicted with icons 222 and 224, which may be overlaid on the images from the presently viewed panorama, e.g., by replacing pixels in portions of the images of the panorama with pixels depicting the icons, for instance with the interactive-tour web server 57 or the browser of the computers 59 (FIG. 4). In some embodiments, the horizontal portion (left and right in the view of FIG. 11) of the panorama in which icons 222 and 224 are depicted may be selected based on the location of panoramas identified by the icons 222 and 224, e.g., a panorama to the right of the present view may be depicted to the right and vice versa. Further, the size of the icons 222 and 224 may be selected based on the distance between the presently viewed position and the location of the corresponding panoramas, e.g., the icons may be sized proportionally to the distance. The regions of the interface 218 in which the icons 222 and 224 are depicted may correspond to a space in the interface in which events are caught by the interface 218 that identify a request to view the panorama corresponding to icons 222 or 224, e.g., a user clicking on or touching icon 222 or 224 may be such an event, which may be handled in the fashion described above for retrieving images from the interactive-tour web server 57. As a result, in this embodiment, a user may navigate through the indoor space 218 and view the indoor space 218 from different perspectives while maintaining a sense of the relative location of the positions from which the user is viewing the room.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" or "a element" includes a combination of two or more elements. The term "or" is, unless indicated otherwise, non-exclusive, i.e., encompassing both "and" and "xor". Terms relating to causal relationships, e.g., "in response to," "upon," "when," and the like, encompass both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

The invention claimed is:

1. A system for providing a web tour of a geographic location, the system comprising:
    a memory storing a plurality of spatially referenced panoramic images of the geographic location;
    one or more processors in communication with the memory, the one or more processors configured to:
        receive a request to display one or more of the plurality of spatially referenced panoramic images, the request specifying a position in the geographic location, wherein selected ones of the spatially referenced panoramic images are textured-mapped onto a three-dimensional model of the geographic location in order to simulate views from additional positions from which panoramas were not captured when full 360-degree panoramas are not used;
        provide for display a portion of the spatially referenced panoramic images having a viewpoint corresponding to the specified position;
        generate one or more icons corresponding to the portion of the spatially referenced panoramic images, the one or more icons providing additional viewer positions for a web tour based on the portion of the spatially referenced panoramic images and one or more additional spatially referenced panoramic images; and
        provide for display the generated one or more icons overlaid on the portion of the spatially referenced panoramic image, wherein a size of each of the one or more icons corresponds to a distance between a presently viewed position and a location of a corresponding panoramic image.

2. The system of claim 1, wherein the size of each of the one or more icons is proportional to the distance between the presently viewed position and the location of the corresponding panoramic image.

3. The system of claim 1, wherein the generated one or more icons corresponds to one or more spaces in a user interface that identify one or more request options to view the corresponding panoramic image associated with a respective one of the icons.

4. The system of claim 1, wherein the one or more processors, in response to the received request, transmits a request for responsive image data to a tour web server.

5. The system of claim 4, wherein the tour web server comprises one or more processing devices coupled to a spatially-referenced tour repository and configured to select one or more of the spatially referenced panoramic images of a set in response to the request, and to transmit the selected spatially referenced panoramic images to a client device for presentation in a virtual tour on the user interface.

6. The system of claim 5, wherein the spatially-referenced tour repository is operatively coupled to a spatial referencer and configured to store the set of spatially-referenced panoramic images associated with the indoor space in memory.

7. The system of claim 6, wherein the spatial reference comprises one or more processors configured to receive a plurality of distance-referenced panoramic images of the indoor space and to convert the plurality of distance-referenced panoramic images into the set of corresponding spatially referenced panoramic images associated with an indoor space.

8. The system of claim 1, wherein the one or more processors are further configured to, in response to the received request, navigate the indoor space to view the panoramic images while maintaining different perspectives.

9. The system of claim 1, wherein the received request is a selection of one of the one or more icons.

10. A method, comprising:
receiving, by one or more processors, a request for one or more of a plurality of spatially referenced panoramic images, the request specifying a position;
providing for display, by the one or more processors, a portion of the spatially referenced panoramic images having a viewpoint corresponding to the specified position, wherein selected ones of the spatially referenced panoramic images are textured-mapped onto a three-dimensional model of the geographic location in order to simulate views from additional positions from which panoramas were not captured when full 360-degree panoramas are not used;
generating, by the one or more processors, one or more icons corresponding to the portion of the spatially referenced panoramic images, the one or more icons providing additional viewer positions for a web tour based on the portion of the spatially referenced panoramic images and one or more additional spatially referenced panoramic images; and
providing for display the generated one or more icons overlaid on the portion of the spatially referenced panoramic image, wherein a size of each of the one or more icons corresponds to a distance between a presently viewed position and a location of a corresponding panoramic image.

11. The method of claim 10, wherein the size of each of the one or more icons is proportional to the distance between the presently viewed position and the location of the corresponding panoramic image.

12. The method of claim 10, wherein the generated one or more icons correspond to one or more spaces in a user interface that identify one or more request options to view the corresponding panoramic image associated with a respective one of the icons.

13. The method of claim 10, further comprising receiving a user interaction selecting one of the generated one or more icons.

14. The method of claim 10, further comprising transmitting a request for responsive image data to a tour web server, wherein the tour web server comprises one or more processing devices coupled to a spatially-referenced tour repository and configured to select one or more of the spatially referenced panoramic images of a set in response to the request, and to transmit the selected spatially referenced panoramic images to a client device for presentation in a virtual tour on the user interface.

15. The method of claim 14, wherein the spatially-referenced tour repository is operatively coupled to a spatial referencer and configured to store the set of spatially referenced panoramic images associated with the indoor space in memory.

16. The method of claim 15, wherein the spatial reference comprises one or more processors configured to receive a plurality of distance-referenced panoramic images of the indoor space and to convert the plurality of distance-referenced panoramic images into the set of corresponding spatially referenced panoramic images associated with the indoor space.

17. The method of claim 10, further comprising navigating the indoor space from one or more perspectives.

18. The method of claim 17, further comprising maintaining a sense of a relative location of the position from which a user is viewing the indoor space.

* * * * *